(12) United States Patent
Shimizu et al.

(10) Patent No.: US 11,048,054 B2
(45) Date of Patent: Jun. 29, 2021

(54) OPTICAL FIBER CABLE AND METHOD OF MANUFACTURING OPTICAL FIBER CABLE

(71) Applicant: Fujikura Ltd., Tokyo (JP)

(72) Inventors: Shogo Shimizu, Sakura (JP); Akira Namazue, Sakura (JP); Go Taki, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/610,018

(22) PCT Filed: May 9, 2018

(86) PCT No.: PCT/JP2018/017936
§ 371 (c)(1),
(2) Date: Oct. 31, 2019

(87) PCT Pub. No.: WO2018/221142
PCT Pub. Date: Dec. 6, 2018

(65) Prior Publication Data
US 2020/0073068 A1  Mar. 5, 2020

(30) Foreign Application Priority Data

Jun. 2, 2017 (JP) .............................. JP2017-109872
Mar. 6, 2018 (JP) .............................. JP2018-039696

(51) Int. Cl.
*G02B 6/44* (2006.01)
*G02B 6/48* (2006.01)

(52) U.S. Cl.
CPC .......... *G02B 6/441* (2013.01); *G02B 6/4432* (2013.01); *G02B 6/483* (2013.01)

(58) Field of Classification Search
CPC ....... G02B 6/441; G02B 6/4432; G02B 6/483
USPC .......................................................... 385/102
See application file for complete search history.

(56) References Cited

U.S. PATENT DOCUMENTS

| | | | |
|---|---|---|---|
| 5,621,841 A | 4/1997 | Field | |
| 5,630,003 A | 5/1997 | Arroyo | |
| 6,249,629 B1 | 6/2001 | Bringuier | |
| 6,671,441 B1 * | 12/2003 | Bocanegra | G02B 6/443 385/112 |
| 7,590,322 B2 | 9/2009 | Puzan et al. | |

(Continued)

FOREIGN PATENT DOCUMENTS

| | | |
|---|---|---|
| CN | 1697989 A | 11/2005 |
| CN | 203720422 U | 7/2014 |

(Continued)

OTHER PUBLICATIONS

Translation of International Search Report issued in corresponding International Application No. PCT/JP2018/017938, dated Jul. 17, 2018 (2 pages).

(Continued)

*Primary Examiner* — Jerry M Blevins
(74) *Attorney, Agent, or Firm* — Osha Bergman Watanabe & Burton LLP

(57) ABSTRACT

An optical fiber cable includes: a core; an outer filling disposed outside the core; and a sheath that covers the core and the outer filling. The core includes: optical fibers; an inner filling; and a wrapping tube that wraps the optical fibers and the inner filling. The outer filling and the inner filling absorb water.

18 Claims, 12 Drawing Sheets

(56) References Cited

U.S. PATENT DOCUMENTS

| | | |
|---|---|---|
| 2003/0049002 A1 | 3/2003 | Bosisio et al. |
| 2004/0146255 A1* | 7/2004 | Ishikawa ............ G02B 6/4403 385/114 |
| 2007/0297730 A1 | 12/2007 | Bringuier et al. |
| 2015/0049996 A1 | 2/2015 | Gibbs et al. |
| 2015/0309274 A1 | 10/2015 | Hurley et al. |
| 2016/0169711 A1* | 6/2016 | Blakley .................. G01K 1/08 374/137 |

FOREIGN PATENT DOCUMENTS

| | | |
|---|---|---|
| CN | 205899095 U | 1/2017 |
| EP | 0286349 A2 | 10/1988 |
| EP | 0438684 A2 | 7/1991 |
| JP | S6350806 A | 3/1988 |
| JP | H05203852 A | 8/1993 |
| JP | H8-146259 A | 6/1996 |
| JP | H09-113772 A | 5/1997 |
| JP | H9-120009 A | 5/1997 |
| JP | H10-170780 A | 6/1998 |
| JP | H10153714 A | 6/1998 |
| JP | H11-183764 A | 7/1999 |
| JP | 2000171672 A | 6/2000 |
| JP | 2001-139802 A | 5/2001 |
| JP | 2002-72032 A | 3/2002 |
| JP | 2008-191209 A | 8/2008 |
| JP | 2013088746 A | 5/2013 |
| JP | 2014137480 A | 7/2014 |
| JP | 2014139609 A | 7/2014 |
| JP | 2014219494 A | 11/2014 |
| JP | 2015031810 A | 2/2015 |
| JP | 2015-99314 A | 5/2015 |
| JP | 2017049510 A | 3/2017 |
| NO | 03/085436 A1 | 10/2003 |

OTHER PUBLICATIONS

Search Report of Chinese Office Action issued in corresponding Chinese Application No. 201880034975.2 dated Jun. 9, 2020 (3 pages).

* cited by examiner

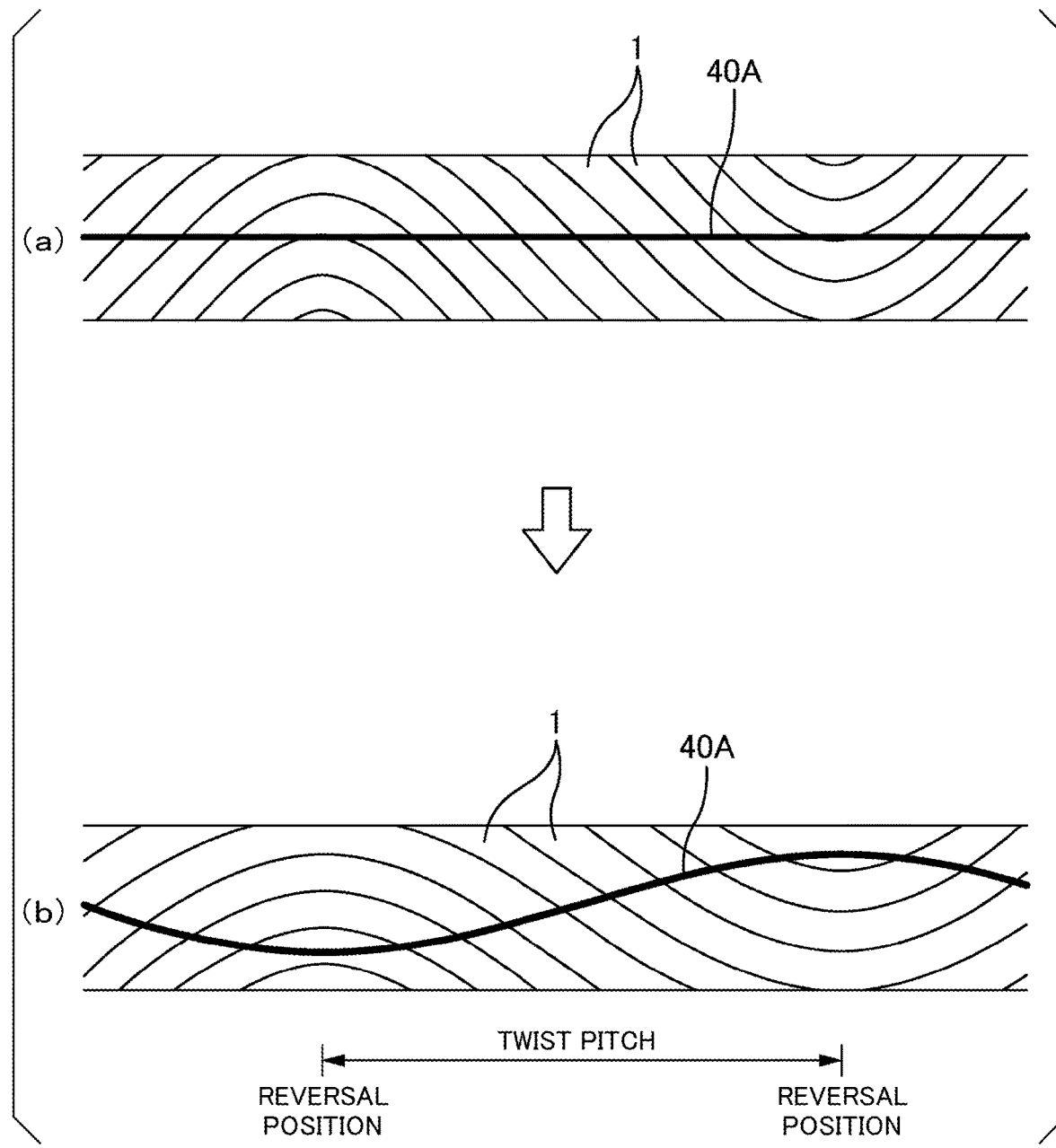

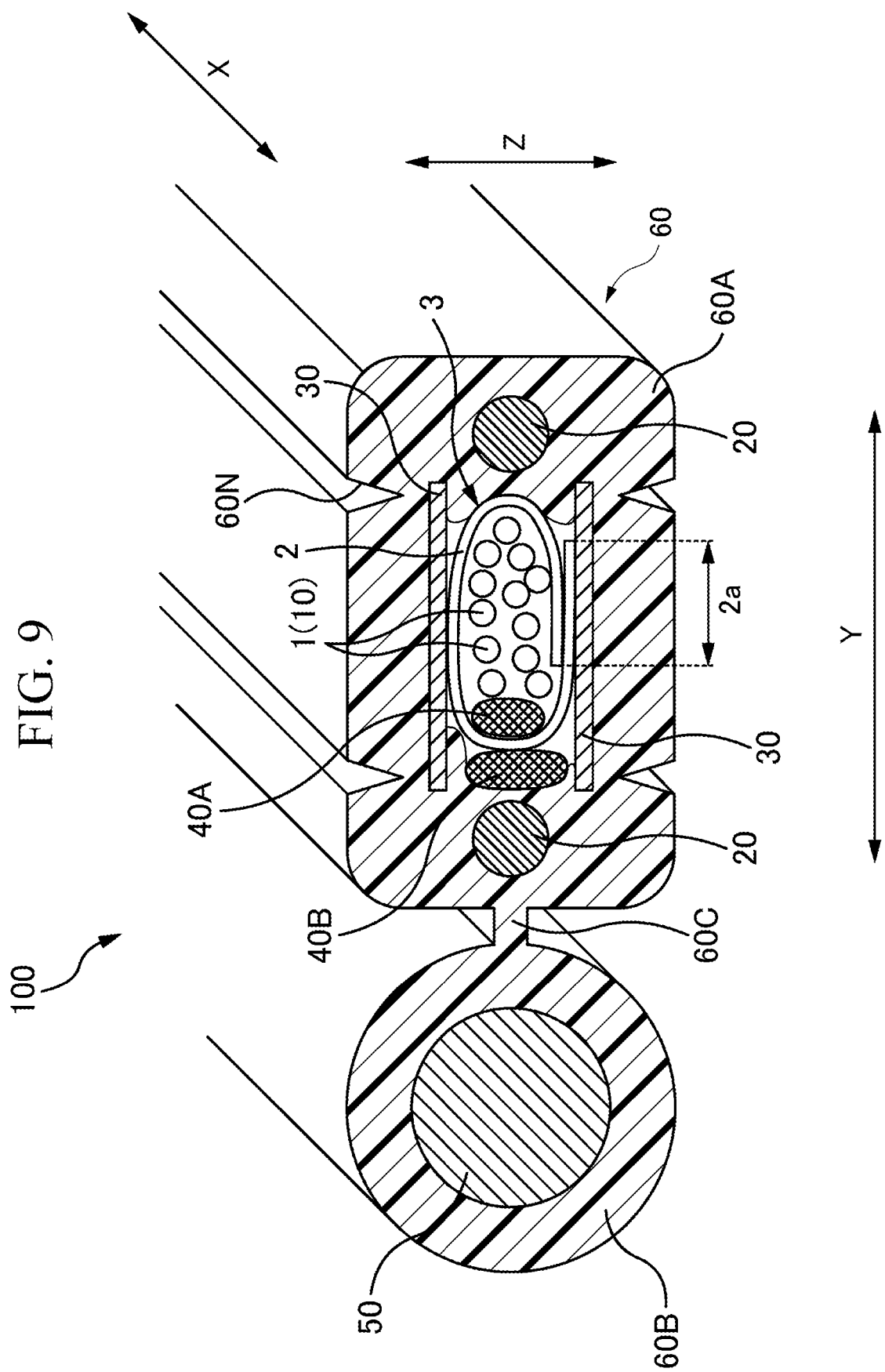

OPTICAL FIBER CABLE AND METHOD OF MANUFACTURING OPTICAL FIBER CABLE

TECHNICAL FIELD

The present invention relates to an optical fiber cable and a method of manufacturing an optical fiber cable.

Priority is claimed on Japanese Patent Application No. 2017-109872 filed in Japan on Jun. 2, 2017 and Japanese Patent Application No. 2018-039696 filed in Japan on Mar. 6, 2018, the content of which is incorporated herein by reference.

BACKGROUND

In the related art, optical fiber cables as disclosed in PTL 1 and PTL 2 are known. These optical fiber cables are configured by accommodating a plurality of optical fibers in a sheath.

In this type of optical fiber cable, a core may be formed by wrapping a plurality of optical fibers and a filling with a press winding tape (also referred to simply as a wrapping tube), and the core may be accommodated in a sheath. Further, the use of filling having water absorbency may prevent water from running in the optical fiber cable.

However, in a case where such a core is formed, it has been found that the desired waterproof performance may not be obtained depending on the position and state of the filling.

PATENT LITERATURE

[PTL 1] Japanese Unexamined Patent Application, First Publication No. 2014-219494

[PTL 2] Japanese Unexamined Patent Application, First Publication No. 2014-139609

SUMMARY

One or more embodiments of the present invention provide an optical fiber cable having stable waterproof performance.

An optical fiber cable according to one or more embodiments of the present invention includes a core including a plurality of optical fibers, an inner filling, and a wrapping tube which wraps the plurality of optical fibers and the inner filling; an outer filling that is disposed outside the core; and a sheath that covers the core and the outer filling.

A method of manufacturing an optical fiber cable according to one or more embodiments of the present invention includes forming a core by wrapping a plurality of optical fibers and an inner filling with a wrapping tube; and forming a sheath that covers the core and an outer filling, in a state where the outer filling is attached to the outside of the core.

One or more embodiments of the present invention provide an optical fiber cable having stable waterproof performance due to an outer filling and an inner filling.

BRIEF DESCRIPTION OF THE DRAWINGS

FIG. 8 is an explanatory view (conceptual view) of a fourth twisting method of the optical fiber unit and the inner filling.

FIG. 9 is a cross-sectional view of an optical fiber cable according to one or more embodiments.

DETAILED DESCRIPTION

Figure 1:
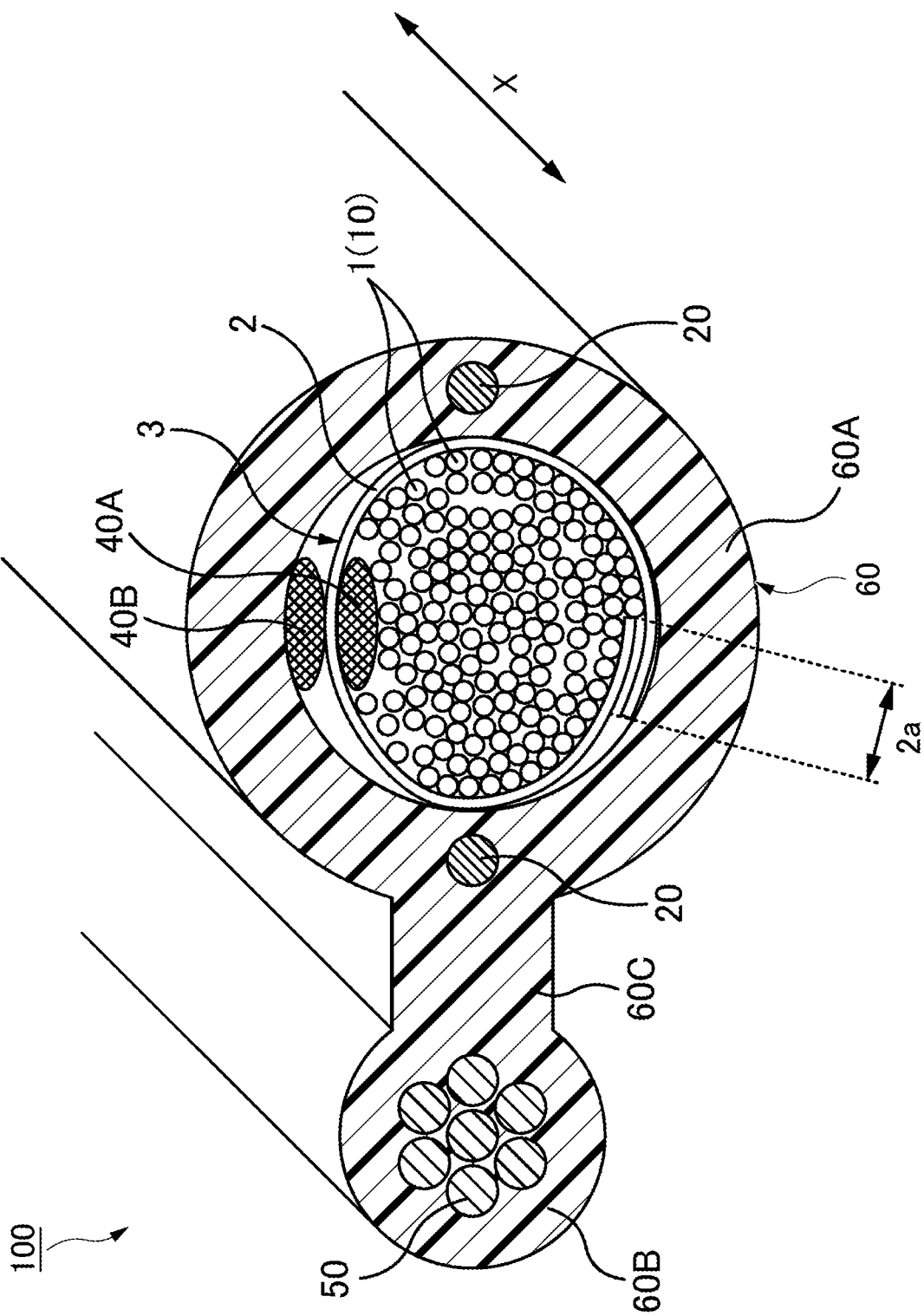
FIG. 1 is a transverse cross-sectional view of an optical fiber cable according to one or more embodiments.

At least the following matters will be clear from the description of the specification and drawings to be described below. It is clear that an optical fiber cable includes a core including a plurality of optical fibers, an inner filling, and a wrapping tube which wraps the plurality of optical fibers and the inner filling; an outer filling that is disposed outside the core; a pair of tension members disposed so as to sandwich the core; and a sheath that covers the core, the outer filling, and the pair of tension members, in which the outer filling is longitudinally attached to the outside of the core, and the inner filling is twisted and disposed in an SZ manner inside the core. Thus, the fillings can be prevented from being unevenly disposed in the optical fiber cable, and local deterioration of the waterproof property can be suppressed.

It is desirable for the wrapping tube to be wound so as to have an overlapping area of both edges of the wrapping tube, and for the outer filling to be disposed at a position not adjacent to the overlapping area of the wrapping tube. Thus, the outer filling can be suppressed from entering the inside of the wrapping tube from the overlapping area of the wrapping tube.

It is desirable for the outer filling to be disposed on the opposite side of the overlapping area of the wrapping tube as viewed from the core. Thus, the outer filling can be further suppressed from entering the inside of the wrapping tube from the overlapping area of the wrapping tube.

It is desirable for the outer filling to be disposed closer to the outside edge of the wrapping tube which is outside of the overlapping area. Thus, the outer filling can be further suppressed from entering the inside of the wrapping tube from the overlapping area of the wrapping tube.

It is desirable for the plurality of optical fibers to be twisted and arranged in the SZ manner. Thus, the transmission loss of the optical fiber can be suppressed.

It is desirable for the inner filling to be twisted in the SZ manner together with the plurality of optical fibers. Thus, both the inner filling and the plurality of optical fibers can be twisted in the SZ manner.

It is desirable for the inner filling to be disposed so as to cross SZ-shaped gaps of the optical fibers. Thus, the running of water in the gaps of the optical fibers can be suppressed.

It is desirable for the phase of the SZ-shaped twist of the inner filling to be shifted by 180 degrees with respect to the SZ-shaped twist of the optical fiber. Thus, the running of water in the gaps of the optical fibers can be further suppressed.

A method of manufacturing an optical fiber cable in which a core is formed by wrapping a plurality of optical fibers twisted in an SZ manner and an inner filling with a wrapping tube, and an outer filling longitudinally attached to the outside of the core and a pair of tension members arranged so as to sandwich the core are collectively covered with a sheath is provided. Thus, the fillings can be prevented from being unevenly disposed in the optical fiber cable, and local deterioration of the waterproof property can be suppressed.

It is desirable for the plurality of optical fibers and the inner filling to be twisted together in an SZ manner. Thus, both the inner filling and the plurality of optical fibers can be twisted in the SZ manner by a simple method.

It is desirable for the plurality of optical fibers and the inner filling to be twisted separately in an SZ manner. Thus, the twist of the inner filling can be arbitrarily set with respect to the twist of the optical fiber.

It is desirable for the inner filling to be twisted in the SZ manner by attaching the inner filling along the longitudinal direction to the outer periphery of the plurality of optical fibers twisted in the SZ manner. Thus, the inner filling can be twisted in the SZ manner by a simple method.

It is desirable for the inner filling to be twisted in an SZ manner in the direction opposite to the twisting direction of the plurality of optical fibers by attaching the inner filling along the longitudinal direction to the outer peripheries of the plurality of optical fibers twisted in the SZ manner, and untwisting the plurality of optical fibers.

Thus, the phase of the SZ-shaped twist of the inner filling can be shifted by 180 degrees with respect to the SZ-shaped twist of the optical fiber, and running of water in the gaps of the optical fibers can be suppressed.

<Overall Configuration>

FIG. 1 is a cross-sectional view (hereinafter simply referred to as "transverse cross-sectional view") orthogonal to the longitudinal direction of the optical fiber cable 100 according to one or more embodiments. Hereinafter, the longitudinal direction of the optical fiber cable 100 is simply referred to as the longitudinal direction, and is represented by the X axis.

The optical fiber cable 100 includes a main body portion having a core 3 and a support wire portion having a support wire 50. The main body portion and the support wire portion are each formed in a substantially circular shape in a transverse cross-sectional view. The outer diameter of the main body portion is larger than the outer diameter of the support wire portion.

The support wire portion is configured by covering the support wire 50 made of a steel wire or the like with a sheath 60 (second covering portion 60B). The support wire portion and the main body portion are connected by the sheath 60 (connecting portion 60C). By cutting the connecting portion 60C, the main body portion and the support wire portion can be separated. In the present specification, both of the optical fiber cable with the supporting wire and the optical fiber cable only including the main body portion without the support wire portion are simply referred to as the "optical fiber cable 100".

The optical fiber cable 100 includes a core 3 having an optical fiber unit 10, a pair of tension members 20, and a sheath 60. In addition, the optical fiber cable 100 according to one or more embodiments includes an inner filling 40A and an outer filling 40B.

The optical fiber unit 10 is configured with a plurality of optical fibers 1 (optical fiber core wires). Here, the optical fiber unit 10 is configured with a plurality of intermittently-adhered optical fiber ribbons (intermittently-fixed optical fiber ribbons).

Figure 2A:
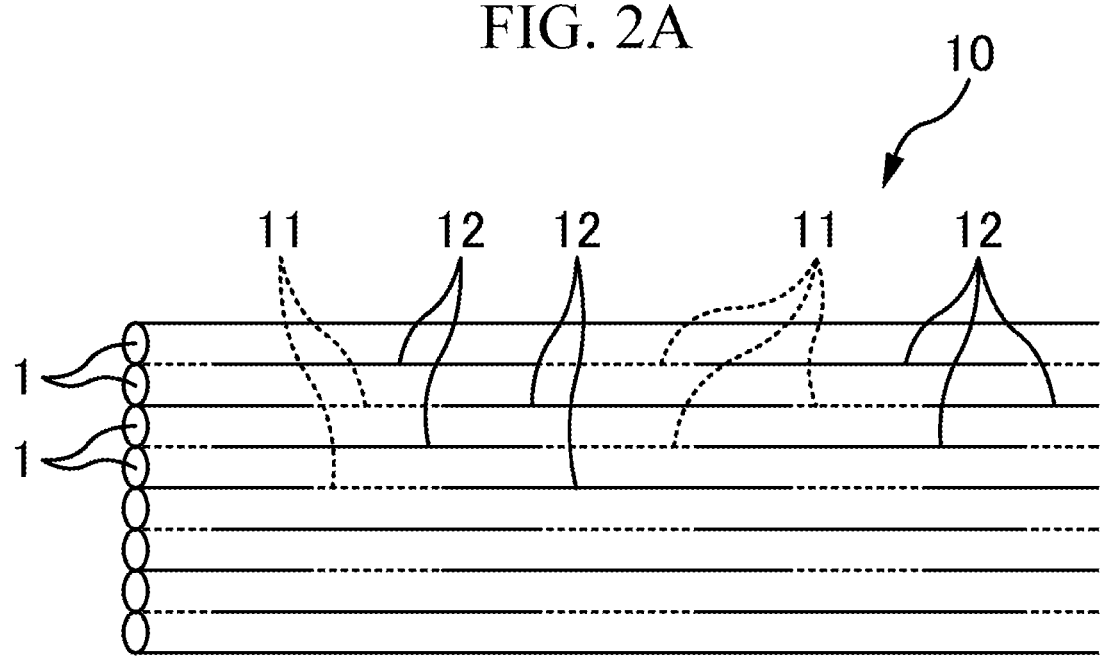
FIG. 2A is an explanatory view of an intermittently-adhered optical fiber ribbon.
Figure 2B:
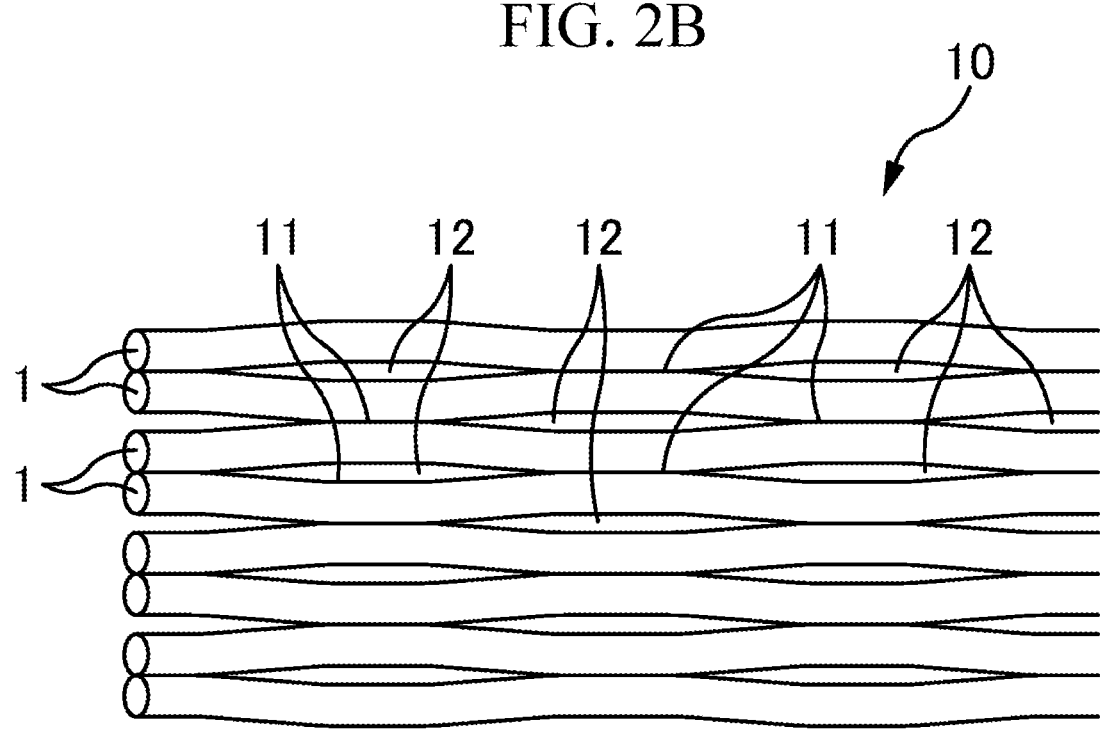
FIG. 2B is an explanatory view of the intermittently-adhered optical fiber ribbon.

FIGS. 2A and 2B are explanatory views of an intermittently-adhered optical fiber ribbon. The intermittently-adhered optical fiber ribbon is an optical fiber ribbon in which a plurality of optical fibers 1 are arranged in parallel with each other, and are intermittently connected. In the following description, the direction in which the plurality of optical fibers 1 are arranged in parallel is referred to as the ribbon width direction.

Two adjacent optical fibers 1 are connected by a connecting portion 11. A plurality of connecting portions 11 which connect two adjacent optical fibers 1 are intermittently disposed in the longitudinal direction. Further, the plurality of connecting portions 11 of the optical fiber ribbon are intermittently disposed two-dimensionally in the longitudinal direction and the ribbon width direction. The connecting portions 11 are formed by applying an ultraviolet curing resin as an adhesive to the optical fibers 1 arranged in parallel and then irradiating and solidifying the fibers with ultraviolet rays. In addition, the connecting portions 11 may be made of a thermoplastic resin.

A region other than the connecting portion 11 between two adjacent optical fibers 1 is a non-connecting portion 12 (separation portion). In the non-connecting portion 12, two adjacent optical fibers 1 are not connected. The connecting portions 11 and the non-connecting portions 12 are alternately arranged in the ribbon width direction. Thus, the optical fiber ribbon can be spread in a mesh shape as shown in FIG. 2B by applying force to the ribbon so that it spreads in the width direction of the ribbon. Further, the optical fiber ribbon can be rolled into a bundle, and a large number of optical fibers 1 can be accommodated at a high density. In the non-connecting portion 12, two adjacent optical fibers 1 may be in contact with or separated from each other.

Figure 3A:
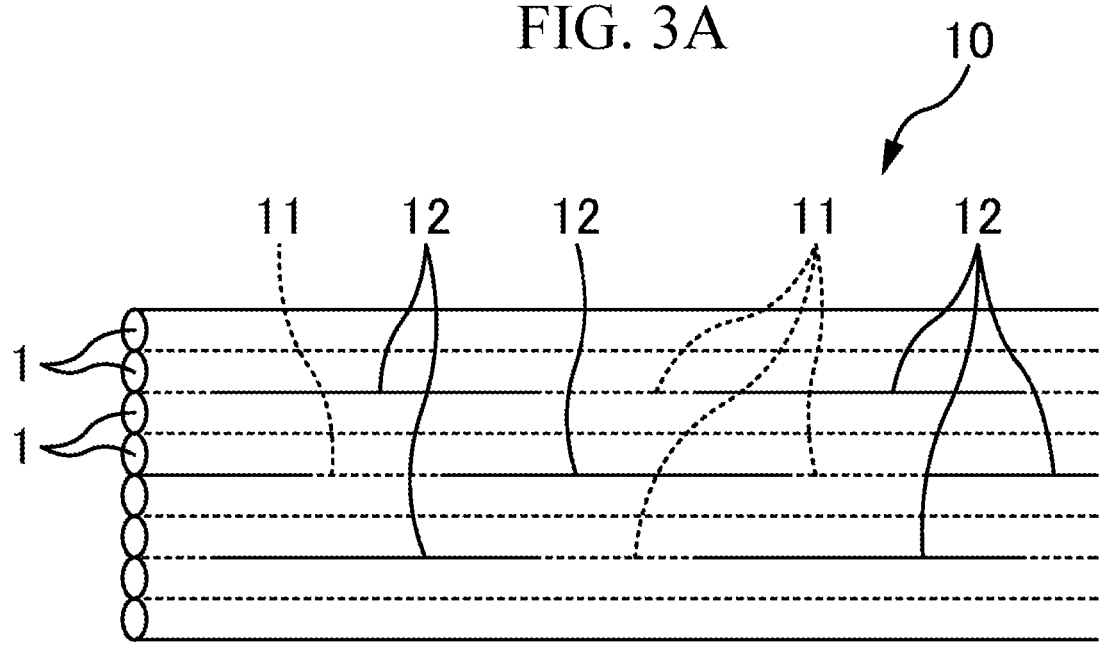
FIG. 3A is an explanatory view of another intermittently-adhered optical fiber ribbon.
Figure 3B:
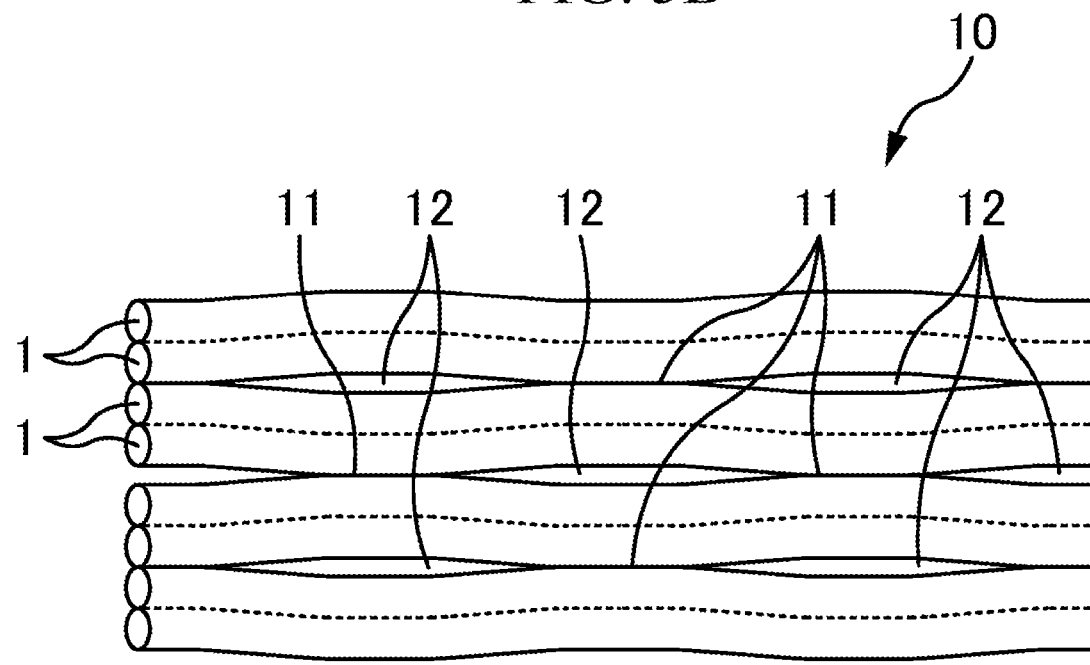
FIG. 3B is an explanatory view of the other intermittently-adhered optical fiber ribbon.

FIGS. 3A and 3B are explanatory views of another intermittently-adhered optical fiber ribbon. The intermittently-adhered optical fiber ribbon includes a plurality of (here, four) pairs of optical fibers 1 (fiber pairs) connected along the longitudinal direction. Adjacent fiber pairs are intermittently connected by the connecting portions 11. Also, in this intermittently-adhered optical fiber ribbon, the connecting portions 11 and the non-connecting portions 12 are alternately arranged in the ribbon width direction. Through this, it is possible to spread the optical fiber ribbon in a mesh shape, or to roll the fiber pairs into a bundle.

The configuration of the intermittently-adhered optical fiber ribbon is not limited to that shown in drawings. For example, the arrangement of the connecting portions 11 may be changed, or the number of optical fibers 1 may be changed. Further, the configuration of the optical fiber unit 10 may be changed as appropriate. For example, the optical fiber unit 10 may be configured by bundling a plurality of single optical fibers 1.

As shown in FIG. 1, the core 3 includes the optical fiber unit 10 and a wrapping tube 2 (press winding tape). Specifically, the core 3 is formed by wrapping the optical fiber unit 10 with the wrapping tube 2. According to one or more embodiments, the core 3 further has an inner filling 40A. The inner filling 40A is disposed inside the wrapping tube 2.

The wrapping tube 2 is a member that wraps the optical fiber unit 10. By wrapping the optical fiber unit 10 with the wrapping tube 2, the optical fiber 1 can be prevented from being buried in (biting into the inside of) the sheath 60 when the sheath is formed 60 with a molten resin. The wrapping tube 2 is made of, for example, a plastic tape member. For example, polyethylene terephthalate (PET) can be used as a material of the wrapping tube 2. According to one or more embodiments, in the cross section of the optical fiber cable 100, the wrapping tube 2 is wound in a spiral shape, and the overlapping area 2a (see FIG. 1) is formed by overlapping the two edges of the wrapping tube 2.

The inner filling 40A is a filling disposed inside the wrapping tube 2. The inner filling 40A has a role of securing the volume of the space (accommodation space) in the first covering portion 60A of the sheath 60. That is, when the sheath 60 is extruded, the inner filling 40A resists the pressure of the resin that forms the sheath 60, thereby making it possible to prevent the accommodation space from being narrowed excessively. In addition, in order to form the accommodation space appropriately, the upper limit and lower limit of the cross-sectional area of the accommodation space are set, and the amount of the inner filling 40A may be adjusted such that the cross-sectional area of the accommodation space is in the range of the upper limit and the lower limit.

According to one or more embodiments, the inner filling 40A is a water absorbing yarn. Since the inner filling 40A has water absorbency as described above, it is possible to suppress running of water on the inside of the core 3 (inside of the wrapping tube 2). As the inner filling 40A, it is desirable to use a yarn whose fineness can be freely selected or changed.

The tension member 20 is a member that resists the contraction of the sheath 60 and suppresses strain, distortion or bending applied to the optical fiber unit 10 (particularly, the optical fiber 1). The tension member 20 is a linear member and is embedded in the inside of the sheath 60. As a material of the tension member 20, non-metallic materials or metallic materials can be used. As non-metallic materials, for example, glass fiber reinforced plastics (GFRP), aramid fiber reinforced plastics (KFRP) reinforced with Kevlar (registered trademark), and fiber reinforced plastics (FRP) such as polyethylene fiber reinforced plastics reinforced with polyethylene fibers can be used. As the metallic material, metal wires such as steel wires can be used. Although the cross-sectional shape of the tension member 20 is circular in FIG. 1, the cross-sectional shape may be flat, elliptical, rectangular, or square, for example. The tension members 20 are disposed in parallel in the longitudinal direction. The core 3 is disposed between the pair of tension members 20.

The outer filling 40B is a filling disposed between the wrapping tube 2 and the sheath 60 (first covering portion 60A). That is, the outer filling 40B is a filling disposed outside the wrapping tube 2. The outer filling 40B has a role of filling the gap between the wrapping tube 2 and the sheath 60. According to one or more embodiments, the outer filling 40B is a water absorbing yarn. Since the outer filling 40B has water absorbency as described above, it is possible to suppress running of water in the gap between the wrapping tube 2 and the sheath 60.

The sheath 60 is a member that covers other components to be accommodated. The sheath 60 covers the periphery of the core 3, the pair of tension members 20, the outer fillings 40B, the support wire 50 and the like all together. The sheath 60 has a first covering portion 60A, a second covering portion 60B, and a connecting portion 60C.

The first covering portion 60A is a portion for collectively covering the periphery of the core 3, the pair of tension members 20, and the outer filling 40B. The first covering portion 60A is formed in a substantially cylindrical shape. The outer shape in the cross section of the first covering portion 60A is circular.

The second covering portion 60B is a portion that covers the support wire 50. The connecting portion 60C is a portion that connects the first covering portion 60A and the second covering portion 60B. The first covering portion 60A, the second covering portion 60B, and the connecting portion 60C are collectively molded of a resin.

As the material of the sheath 60, polyolefin (PO) resin such as polyethylene (PE), polypropylene (PP), ethylene ethyl acrylate copolymer (EEA), ethylene vinyl acetate copolymer (EVA), and ethylene propylene copolymer (EP), polyvinyl chloride (PVC), or the like can be used. The sheath 60 can be formed by extrusion molding or the like. It is desirable for the set temperature for extrusion molding of the sheath 60 to be lower than the melting point of the wrapping tube 2.

<Arrangement of Optical Fiber 1 and Fillings>

The optical fiber unit 10 (a plurality of optical fibers 1) is disposed inside the core 3 (the wrapping tube 2), and is twisted in an SZ manner. Thus, the transmission loss can be suppressed, and the optical fiber 1 can be easily taken out at the time of intermediate post-branching operation.

The outer filling 40B is disposed outside of the core 3. The outer filling 40B is longitudinally attached to (is placed along with) the core 3. When the sheath 60 is extruded, it is difficult to change the position of the outer filling 40B relative to the core 3 in the chamber (in the molten resin). Therefore, by longitudinally attaching the outer filling 40B with the core 3, the optical fiber cable 100 can be manufactured more stably. As a result, in any cross section of the optical fiber cable 100 in the longitudinal direction, the outer filling 40B is disposed at a substantially constant position with respect to the core 3.

In the cross section shown in FIG. 1, the inner filling 40A is disposed closer to the outer filling 40B inside the core 3 (the wrapping tube 2). However, if the inner filling 40A is disposed in the vicinity of the outer filling 40B in any cross section of the optical fiber cable 100 in the longitudinal direction, the inner filling 40A and the outer filling 40B are unevenly disposed in the optical fiber cable 100, and the waterproof property may be reduced on the opposite side of the core 3.

Here, in order to enhance the waterproof property of the whole of the core 3, it is also conceivable to disperse the inner filling 40A inside the core 3 (wrapping tube 2). However, in this case, the amount of the inner filling 40A to be disposed inside the core 3 is relatively large. When the inner filling 40A is dispersed, the transmission loss of the optical fiber 1 may increase due to the contraction of the inner filling 40A (the contraction due to the heat at the time of extrusion molding of the sheath 60).

Therefore, it is desirable to dispose the inner filling 40A in a twisted state inside the wrapping tube 2. However, in a case where the inner filling 40A is spirally twisted in one direction, when the inner filling 40A contracts, the optical fiber unit 10 is wound and tightened by the inner filling 40A, and there is a possibility of the transmission loss of the optical fiber 1 increasing.

Thus, according to one or more embodiments, the inner filling 40A is twisted and disposed in an SZ manner inside the core 3 (the wrapping tube 2). Thus, the position of the inner filling 40A relative to the core 3 (the position in the cross section of the optical fiber cable 100) changes in the longitudinal direction. Accordingly, the inner filling 40A and the outer filling 40B can be suppressed from being unevenly disposed inside the optical fiber cable 100 and local deterioration of the waterproof property can be suppressed. In addition, even if the inner filling 40A is contracted, the optical fiber unit 10 is not tightened by the inner filling 40A, and therefore an increase in the transmission loss of the optical fiber 1 can be suppressed.

According to one or more embodiments, it is desirable for the twist pitch of the inner fillings 40A twisted in the SZ manner to be 3 meters or less. Here, the twist pitch is the interval in the longitudinal direction between the reversal positions in the rotation direction (see FIG. 5B). In other words, the twist pitch is a distance in the longitudinal direction from the position at which the winding direction of the inner filling 40A reverses from the S direction to the Z direction to the position at which the winding direction reverses from the Z direction to the S direction. By setting the twist pitch of the inner filling 40A to 3 meters or less, the running water length inside the core 3 can be set to 3 meters or less, and therefore the optical fiber cable 100 can be adapted to the waterproof test standard (IEC 60794-1-22 F5B).

Further, as shown in FIG. 1, according to one or more embodiments, the outer filling 40B is disposed so as not to be adjacent to the overlapping area 2a of the wrapping tube 2. Thus, the outer fillings 40B can be suppressed from entering the inside of the wrapping tube 2 from the overlapping area 2a.

Further, according to one or more embodiments, the outer filling 40B is disposed on the opposite side of the overlapping area 2a as viewed in the core 3 while being disposed not to be adjacent to the overlapping area 2a of the wrapping tube 2. For example, in the cross section shown in FIG. 1, the overlapping area 2a is disposed below the core 3 in FIG. 1, while the outer filling 40B is disposed above the core 3 in FIG. 1. Thus, the outer filling 40B can be further suppressed from entering the inside of the wrapping tube 2 from the overlapping area 2a.

<Method of Manufacturing Optical Fiber Cable 100>

Figure 4:
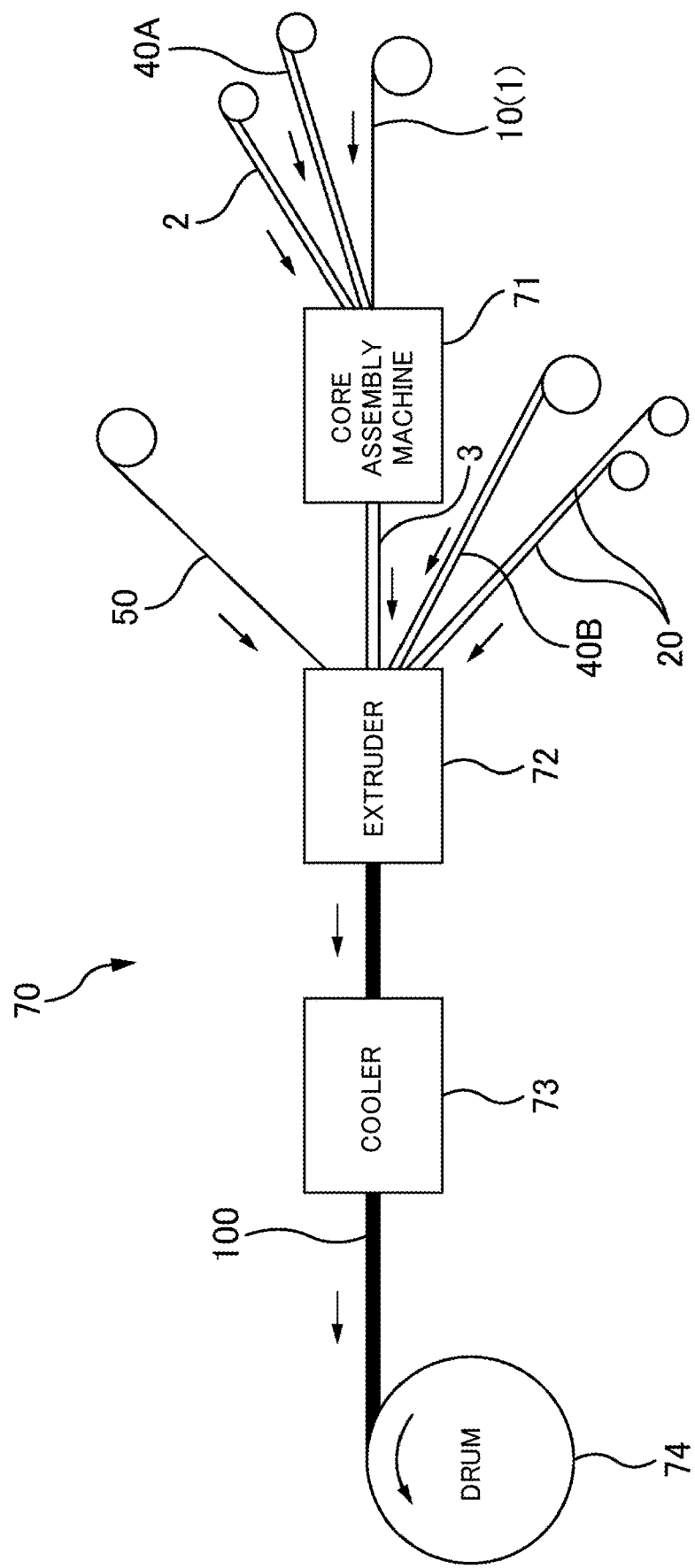
FIG. 4 is an explanatory view of a method of manufacturing an optical fiber cable.

FIG. 4 is an explanatory view of a manufacturing apparatus 70 of the optical fiber cable 100. The manufacturing apparatus 70 includes a supply source of each member, a core assembly machine 71, an extruder 72, a cooler 73, and a drum 74.

The core assembly machine 71 is an apparatus that forms the core 3 by wrapping the optical fiber unit 10 and the inner filling 40A with the wrapping tube 2. Therefore, the core assembly machine 71 is supplied with the optical fiber unit 10 (for example, one or a plurality of intermittently-adhered optical fiber ribbons), the inner filling 40A, and the wrapping tube 2. According to one or more embodiments, the core assembly machine 71 assembles the optical fiber unit 10 and the inner filling 40A while twisting the optical fiber unit 10 and the inner filling 40A in the SZ manner (described later). Then, the core assembly machine 71 forms the core 3 by wrapping the optical fiber unit 10 and the inner filling 40A twisted in the SZ manner with the wrapping tube 2 and sends the core 3 to the extruder 72.

The extruder 72 is an apparatus that extrudes the sheath 60. The core 3, the pair of tension members 20, the outer filling 40B, and the support wire 50 are supplied to the extruder 72. By extruding the molten resin out of the die hole while inserting each member into the die hole (not shown) of the extruder 72, the optical fiber cable 100 in which the members are collectively covered with the sheath 60 is manufactured. In the state where the outer filling 40B is attached to the outside of the core 3 (longitudinally attached), the sheath 60 is extruded.

The cooler 73 is a device that cools the sheath 60 of the optical fiber cable 100. The drum 74 is a member for winding the optical fiber cable 100.

<First Twisting Method (Co-Twisting)>

Figure 5A:
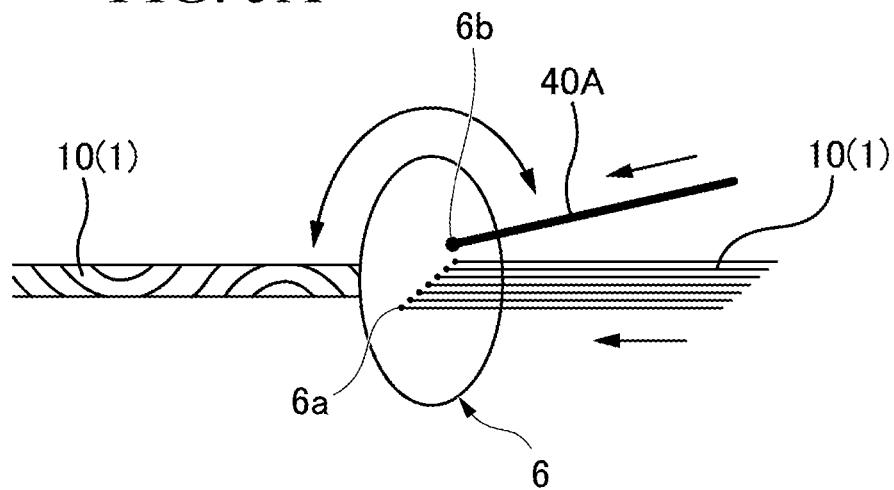
FIG. 5A is an explanatory view of a first twisting method of an optical fiber unit and an inner filling.

FIG. 5A is an explanatory view of a first twisting method of the optical fiber unit 10 and the inner filling 40A.

The core assembly machine 71 has a rotary plate 6 (mesh plate) that swings and rotates (rotates in the SZ direction). The rotary plate 6 is formed in a circular plate shape. The rotary plate 6 has a plurality of unit holes 6a for inserting the optical fiber unit 10 (optical fiber ribbon) and a filling hole 6b for inserting the inner filling 40A. Here, the unit holes 6a and the filling hole 6b are provided in one rotary plate 6, but the unit holes 6a and the filling hole 6b may be provided in separate rotary plates 6. In a case where the unit holes 6a and the filling hole 6b are provided in the separate rotary plates 6, in the first twisting method, the two rotary plates 6 swing and rotate in synchronization. The first twisting method is sometimes called "co-twisting" because the optical fiber unit 10 and the inner filling 40A are twisted together.

Figure 5B:
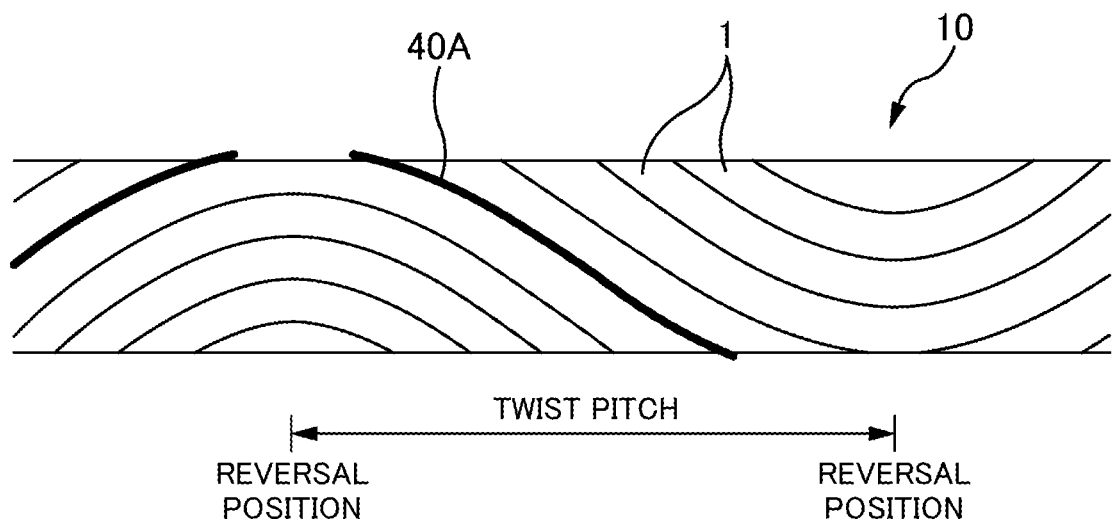
FIG. 5B is an explanatory view (conceptual view) of the optical fiber unit and the inner filling twisted in an SZ manner by the first twisting method.

FIG. 5B is an explanatory view (conceptual view) of the optical fiber unit 10 and the inner filling 40A twisted in the SZ manner by the first twisting method. FIG. 5B is a conceptual diagram for explaining the twisting method, and the scale of the drawing is not accurate (for example, the diameter of the optical fiber 1 is about 0.25 mm while the twist pitch in the drawing is 3 meters or less).

In the case of the first twisting method (co-twisting), the optical fiber unit 10 and the inner filling 40A are twisted together in the SZ manner. Therefore, the twist pitches (the interval in the longitudinal direction between the reversal positions in the rotation direction) of the optical fiber unit 10 and the inner filling 40A are substantially the same, and the reversal positions in the rotational direction are also substantially the same. In other words, the twisting phases of the optical fiber unit 10 and the inner filling 40A substantially match. Further, the twisting angles are substantially the same. Therefore, in the case of the first twist method (co-twisting), the inner filling 40A is disposed so as to be interposed between the optical fibers 1.

According to the first twisting method described above, the optical fiber 1 and the inner filling 40A can be twisted in an SZ manner by a simple method. On the other hand, in the case of the first twisting method, since the optical fiber 1 and the inner filling 40A are twisted together, the inner filling 40A is strongly constrained by the optical fiber 1. Thus, when the inner filling 40A contracts due to the heat generated when the sheath 60 is extruded, the optical fiber 1 is easily subjected to a force from the inner filling 40A, and the transmission loss of the optical fiber 1 may increase. Therefore, it is desirable for the constraint between the inner filling 40A and the optical fiber 1 to be weak. Therefore, in the twisting methods to be described below (second to fourth twisting methods), the optical fiber 1 and the inner filling 40A are each twisted in an SZ manner without being twisted together.

<Second Twisting Method>

Figure 6A:
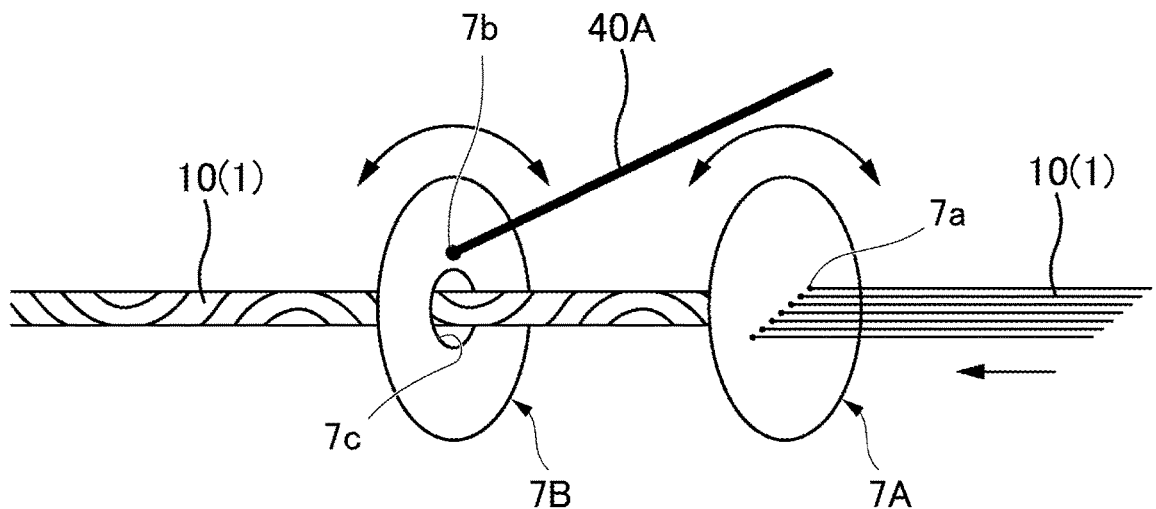
FIG. 6A is an explanatory view of a second twisting method of the optical fiber unit and the inner filling.

FIG. 6A is an explanatory view of a second twisting method of the optical fiber unit 10 and the inner filling 40A.

The core assembly machine 71 has two rotary plates 7A, 7B that swing and rotate (rotate in the SZ direction). The two rotary plates 7A, 7B include a unit rotary plate 7A for twisting the optical fiber unit 10 (optical fiber ribbon) and a filling rotary plate 7B for twisting the inner filling 40A. The unit rotary plate 7A and the filling rotary plate 7B are formed in a circular plate shape.

A plurality of unit holes 7a for inserting the optical fiber unit 10 are formed in the unit rotary plate 7A. The filling rotary plate 7B has a filling hole 7b for inserting the inner filling 40A and a passage hole 7c for passing the optical fiber unit 10 which is twisted by the unit rotary plate 7A. The passage hole 7c is formed at the central portion of the filling rotary plate 7B. The filling hole 7b is located outside the passage hole 7c.

In the second twisting method, it is possible to separately set the swing cycles and the swing angles of the two rotary plates 7A, 7B.

In the second twisting method, when the unit rotary plate 7A swings and rotates, the optical fiber unit 10 is twisted in the SZ manner. Since the cross section of each optical fiber 1 is circular, unevenness due to the outer shape of the optical fiber 1 is formed on the outer periphery of the optical fiber unit 10 configured by bundling a plurality of optical fibers 1. In other words, grooves (concave strips formed by gaps between the adjacent optical fibers 1 on the outer periphery of the optical fiber unit 10) are formed along the optical fibers 1 at the outer periphery of the twisted optical fiber unit 10 (the bundle of the optical fibers 1). According to one or more embodiments, since the plurality of optical fibers 1 are twisted in the SZ manner, the grooves formed on the outer periphery of the optical fiber unit 10 are also formed in the SZ manner. That is, on the outer periphery of the bundle of optical fibers 1, grooves between the adjacent optical fibers 1 are formed in the SZ manner.

Further, in the second twisting method, the filling rotary plate 7B swings and rotates on the downstream side of the unit rotary plate 7A, so that the inner filling 40A is twisted and disposed in an SZ manner in the outer periphery of the optical fiber unit 10 twisted in the SZ manner. In the second twisting method, the SZ-shaped twist of the inner filling 40A can be arbitrarily set with respect to the SZ-shaped twist of the optical fiber unit 10 without particular limitation.

Figure 6B:
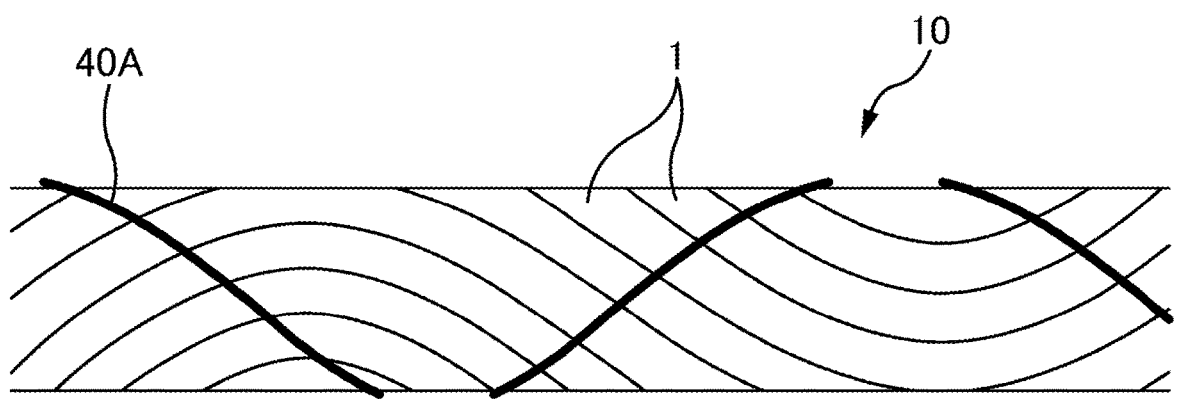
FIG. 6B is an explanatory view (conceptual view) of the optical fiber unit and the inner filling twisted in the SZ manner by a second twisting method.

FIG. 6B is an explanatory view (conceptual view) of the optical fiber unit 10 and the inner filling 40A twisted in the SZ manner by the second twisting method.

In the case of the second twisting method, it is possible to make the twist pitches and the reversal positions in the rotation direction of the optical fiber unit 10 and the inner filling 40A different. Further, it is possible to make the twist angles of the optical fiber unit 10 and the inner filling 40A different. That is, according to the second twisting method, the twist pitch, the twist angle, and the like of the inner filling 40A can be arbitrarily set independently with respect to the twist of the optical fiber unit 10.

In the case of the second twisting method, the inner filling 40A is disposed to cross the SZ-shaped grooves formed on the outer periphery of the twisted optical fiber unit 10 (bundle of the optical fibers 1). If at least one of the twist pitches, the reversal positions in the rotation direction, or the twist angles of the optical fiber unit 10 and the inner filling 40A is different, the inner filling 40A can be disposed to cross the SZ-shaped grooves. By disposing the inner filling 40A to cross the grooves, compared with the case where the inner filling 40A is interposed between the specific optical fibers 1 as shown in FIG. 5B, it is possible to suppress running of water in the gaps between the optical fibers 1. If the phase of the SZ-shaped twist of the inner filling 40A to the SZ-shaped twist of the optical fiber unit 10 is shifted by 180 degrees, the inner filling 40A can be disposed to cross more grooves, and therefore it is possible to further suppress running of water in the gaps between the optical fibers 1.

However, in the case of the first and second twisting methods described above, the rotary plates 6, 7B having the filling holes 6b, 7b are swung in order to twist the inner filling 40A in the SZ manner, so that the core assembly machine 71 will be enlarged. Therefore, in the twisting methods to be described below (third and fourth twisting methods), the inner filling 40A is twisted in the SZ manner without the inner filling 40A being moved largely by the rotary plate.

<Third Twisting Method>

Figure 7A:
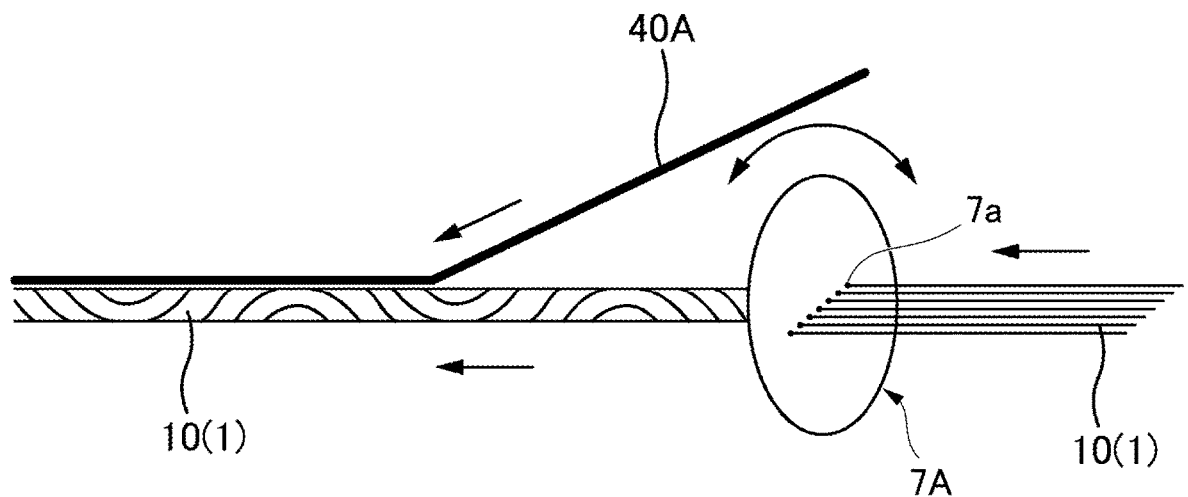
FIG. 7A is an explanatory view of a third twisting method of the optical fiber unit and the inner filling.

FIG. 7A is an explanatory view of a third twisting method of the optical fiber unit 10 and the inner fillings 40A.

The core assembly machine 71 has a unit rotary plate 7A that swings and rotates (rotates in the SZ direction) to twist the optical fiber unit 10 (optical fiber ribbon). In the third twisting method, unlike the first twisting method and the second twisting method, since the rotary plate for twisting the inner filling 40A is not provided, the configuration of the core assembly machine 71 can be simplified.

In the third twisting method, when the unit rotary plate 7A swings and rotates, the optical fiber unit 10 is twisted in the SZ manner. Since the cross section of each optical fiber 1 is circular, unevenness due to the outer shape of the optical fiber 1 is formed on the outer periphery of the optical fiber unit 10 configured by bundling a plurality of optical fibers 1. In other words, the above-described grooves are formed along the optical fiber 1 on the outer periphery of the twisted optical fiber unit 10 (the bundle of optical fibers 1). According to one or more embodiments, since the plurality of optical fibers 1 are twisted in the SZ manner, the grooves are also formed in the SZ manner.

In the third twisting method, the inner filling 40A is longitudinally attached to the optical fiber unit 10 twisted in the SZ manner, on the downstream side of the unit rotary plate 7A. Thus, the inner filling 40A is attached to the outer periphery of the optical fiber unit 10 along the longitudinal direction. When the inner filling 40A is joined to the optical fiber unit 10 at a predetermined pressure, the inner filling 40A is guided to the inside of the grooves described above. As a result, the inner filling 40A is guided to the SZ-shaped grooves and displaced in the circumferential direction, and the inner filling 40A is twisted in the SZ manner on the outer periphery of the optical fiber unit 10 (see FIG. 7B).

If the inner filling 40A guided to the inside of the grooves does not come out of the grooves while being attached to the outer periphery of the optical fiber unit 10, the twist angle of the inner filling 40A is equal to the twist angle of the optical fiber unit 10. However, the inner filling 40A is usually thicker than the optical fiber 1, and the inner filling 40A is thicker than the width and depth of the grooves. Therefore, the inner filling 40A guided to the grooves may come out of the grooves while being attached to the outer periphery of the optical fiber unit 10. In such a case, the twist angle of the inner filling 40A is smaller than the twist angle of the optical fiber unit 10. That is, in the third twisting method, the twist angle of the inner filling 40A is equal to or less than the twist angle of the optical fiber unit 10. In addition, in a case where the inner filling 40A deviates from the grooves once guided, the twist pitch and the reversal position in the rotation direction of the inner filling 40A may deviate from the twist pitch and the reversal position in the rotation direction of the optical fiber unit 10.

Figure 7B:
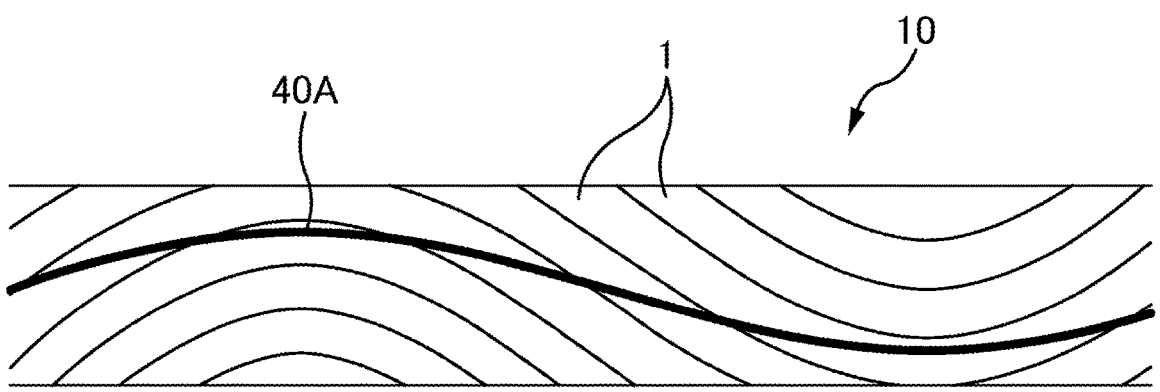
FIG. 7B is an explanatory view of the optical fiber unit and the inner filling twisted in the SZ manner by the third twisting method.

FIG. 7B is an explanatory view (conceptual view) of the optical fiber unit 10 twisted in the SZ manner and the inner filling 40A by the third twisting method.

In the case of the third twisting method, the twist angle of the inner filling 40A is smaller than the twist angle of the optical fiber unit 10. Further, it is also possible to change the phase of the SZ-shaped twist of the inner filling 40A with respect to the SZ-shaped twist of the optical fiber unit 10 by adjusting the back tension of the inner filling 40A. Even in the third twisting method, at least one of the twist pitches, the reversal positions in the rotation direction, and the twist angles of the optical fiber unit 10 or the inner filling 40A can be made different. Therefore, the inner filling 40A can be disposed to cross the SZ-shaped grooves formed on the outer periphery of the optical fiber unit 10 (the bundle of optical fibers 1).

<Fourth Twisting Method>

FIG. 8 is an explanatory view (conceptual view) of a fourth twisting method of the optical fiber unit 10 and the inner filling 40A.

In the fourth twisting method, as shown in part (a) of FIG. 8, the inner filling 40A is longitudinally attached to the optical fiber unit 10 twisted in the SZ manner. In the fourth twisting method, as in the third twisting method, the inner filling 40A is attached along the longitudinal direction to the outer periphery of the optical fiber unit 10 twisted in the SZ manner. Therefore, the core assembly machine 71 does not have to be provided with a rotary plate for twisting the inner filling 40A.

Next, in the fourth twisting method, after the inner filling 40A is longitudinally attached to the optical fiber unit 10 twisted in the SZ manner, the twist is returned such that the twist angle of the optical fiber unit 10 becomes smaller (the twist angle is reduced). At this time, as shown in part (b) of FIG. 8, the inner filling 40A attached to the optical fiber unit 10 at the outer periphery of the optical fiber unit 10 is dragged back to untwist the optical fiber unit 10. As a result, the inner filling 40A is twisted in the SZ manner in the direction opposite to the SZ twist direction of the optical fiber unit 10.

In the case of the fourth twisting method, the twist pitches of the optical fiber unit 10 and the inner filling 40A are substantially the same as each other, and the reversal positions in the rotation direction are also substantially the same as each other, but the rotating directions at the reversal position are reversed. In other words, the phase of the SZ-shaped twist of the inner filling 40A with respect to the SZ-shaped twist of the optical fiber unit 10 is shifted by 180 degrees. Therefore, in the case of the fourth twisting method, since the inner filling 40A can be disposed to cross more grooves, it is possible to further suppress running of water in the gaps of the optical fibers 1.

As described above, the optical fiber cable 100 according to one or more embodiments includes a core 3 including a plurality of optical fibers 1, an inner filling 40A, and a wrapping tube 2 which wraps the plurality of optical fibers 1 and the inner filling 40A, an outer filling 40B disposed outside the core 3, and a sheath 60 that covers the core 3 and the outer filling 40B. Thus, by disposing the fillings on both the inside and the outside of the wrapping tube 2, it is possible to prevent running of water inside and outside the core 3. In addition, since the outer filling 40B is located on the outside of the wrapping tube 2, the outer filling 40B is not easily affected by the twist of the optical fiber 1, and the position is easily stabilized. Accordingly, the optical fiber cable 100 having stable waterproof performance can be provided.

Further, the outer filling 40B and the inner filling 40A have water absorbency (i.e., absorb water). Thereby, the running water inside and outside the core 3 can be prevented more reliably.

Further, the inner filling 40A is disposed such that the position in the core 3 changes in the longitudinal direction. Thereby, as compared with the case where the position of the inner filling 40A in the core 3 does not change, it is possible to suppress the deviation of the waterproof performance in the core 3.

Further, the outer filling 40B is longitudinally attached to the core 3. Thus, the sheath 60 can be easily extruded, and the optical fiber cable 100 can be manufactured more stably.

Further, the position of the inner filling 40A in the core 3 changes in the longitudinal direction, and the outer filling 40B is longitudinally attached to the core 3. By this constitution, the relative positions of the inner filling 40A and the outer filling 40B change in the longitudinal direction of the optical fiber cable 100. Therefore, the inner filling 40A and the outer filling 40B can be prevented from being unevenly disposed in the optical fiber cable 100, and local deterioration in waterproof performance can be suppressed.

When the plurality of optical fibers 1 are twisted in the SZ manner, grooves between the adjacent optical fibers 1 are formed in the SZ manner on the outer periphery of the bundle of the plurality of optical fibers 1. The inner filling 40A may be disposed by the second to fourth twisting methods so as to cross these grooves. With this configuration, it is possible to suppress a running water phenomenon in which the water travels along the grooves, and to enhance the waterproof performance more reliably.

This effect can also be obtained in a case where the plurality of optical fibers 1 are twisted in one direction (helically). That is, by disposing the inner filling 40A so as to cross the grooves between the adjacent optical fibers 1, formed on the outer periphery of the bundle of the plurality of optical fibers 1 twisted together, regardless of the twisted state of the optical fibers 1, waterproof performance can be enhanced.

Further, the wrapping tube 2 is wound so as to have an overlapping area 2a in which both edges of the wrapping tube 2 overlap, and the outer filling 40B is disposed at a position not adjacent to the overlapping area 2a. With this configuration, the outer filling 40B can be suppressed from entering from the overlapping area 2a to the inside of the wrapping tube 2.

A method of manufacturing an optical fiber cable according to one or more embodiments includes forming a core 3 by wrapping a plurality of optical fibers 1 and an inner filling 40A with a wrapping tube; and forming a sheath 60 that covers the core 3 and an outer filling 40B, in a state where the outer filling 40B is attached to the outside of the core 3. According to the manufacturing method, it is possible to manufacture an optical fiber cable 100 having stable waterproof performance, including the inner filling 40A and the outer filling 40B.

FIG. 9 is a transverse cross-sectional view of an optical fiber cable 100 according to one or more embodiments. The same members as according to the embodiments described above are denoted by the same reference numerals, and description thereof is omitted.

According to one or more embodiments, the main body portion having the core 3 is formed in a rectangular shape (square shape), and the support wire portion having the support wire 50 is formed in a circular shape in the transverse cross-sectional view.

In the following description, directions are defined as shown in FIG. 9. The longitudinal direction (X direction) is the direction in which the optical fiber cable 100 extends. A long-side direction (width direction or Y direction) is a direction in which the pair of tension members 20 are arranged. A short-side direction (thickness direction or Z direction) is a direction in which the pair of separators 30 are arranged, and is orthogonal to both the longitudinal direction and the long-side direction. The long-side direction is a direction along the long side in the cross section of the optical fiber cable 100 (main body portion). The short-side direction is a direction along the short side in the cross section of the optical fiber cable 100 (main body portion).

According to the embodiments described above, the optical fiber cable 100 includes a core 3 having an optical fiber unit 10, a pair of tension members 20, and a sheath 60. Further, the optical fiber cable 100 according to one or more embodiments includes a pair of separators 30. Similar to the above-described embodiments, the optical fiber cable 100 has an inner filling 40A and an outer filling 40B.

According to the above-described embodiments, the optical fiber unit 10 is configured with a plurality of intermittently-adhered optical fiber ribbons (intermittently-fixed optical fiber ribbons). On the other hand, the optical fiber unit 10 according to one or more embodiments is configured with one intermittently-adhered optical fiber ribbon. Further, the configuration of the optical fiber unit 10 may be changed as appropriate. For example, the optical fiber unit 10 may be configured with a plurality of optical fiber ribbons, or may be configured by bundling a plurality of single optical fibers 1.

According to one or more embodiments, a 12-fiber optical fiber cable 100 is configured instead of the 24-fiber optical fiber cable which is generally used. Thus, in a case where the number of fibers of the optical fiber 1 included in the core 3 is small, the inner filling 40A has a role of securing the volume of the accommodation space in the first covering portion 60A. Similar to the above-described embodiments, the inner filling 40A is a water absorbing yarn. This makes it possible to suppress running of water on the inside of the core 3 (the inside of the wrapping tube 2).

The separators 30 are members for facilitating the separation operation of the sheath 60. The separators 30 are tape-shaped (flat-shaped and strip-shaped) members, and are disposed between the core 3 (the wrapping tube 2) and the sheath 60 along the longitudinal direction. The thickness of the separators 30 is, for example, about 0.2 mm. The separators 30 are not fused or adhered to the sheath 60, and are formed of a material that easily peels off from the sheath 60. The tape-shaped separators 30 are disposed such that the tape surfaces are parallel to the width direction. The pair of separators 30 are disposed side by side in the thickness direction. The core 3 is disposed between the pair of separators 30. Further, according to one or more embodiments, the outer filling 40B is disposed between the pair of separators 30. Further, similar to the above-described embodiments, a structure in which the separators 30 are not provided may be adopted.

The sheath 60 according to one or more embodiments covers the periphery of the core 3, the pair of tension members 20, the pair of separators 30, the outer filling 40B, the support wire 50 and the like. The first covering portion 60A covers the periphery of the core 3, the pair of tension members 20, the pair of separators 30, and the outer filling 40B. The first covering portion 60A has a substantially rectangular outer shape in a cross section. A plurality of notches 60N are formed on the outer surface of the first covering portion 60A. Here, a pair of the notches 60N are provided on each of the upper and lower surfaces, but the notches 60N may be formed one by one on the upper and lower surfaces. Further, similar to the above-described embodiments, the notches 60N may not be present. It is desirable for the set temperature for extrusion molding of the sheath 60 to be lower than the melting points of the separator 30 and the wrapping tube 2.

Similar to the above-described embodiments, the outer filling 40B is longitudinally attached to the outside of the core 3, and the inner filling 40A is twisted and disposed in an SZ manner inside the core 3. Thus, as in the above-described embodiments, the position of the inner filling 40A relative to the core 3 (the position in the cross section of the optical fiber cable 100) changes in the longitudinal direction. Accordingly, the inner filling 40A and the outer filling 40B can be suppressed from being unevenly disposed inside the optical fiber cable 100 and local deterioration of the waterproof property can be suppressed. In addition, even if the inner filling 40A is contracted, the optical fiber unit 10 is not tightened by the inner filling 40A, and thus an increase in the transmission loss of the optical fiber 1 can be suppressed.

Similar to the above-described embodiments, the outer filling 40B is disposed so as not to be adjacent to the overlapping area 2*a* of the wrapping tube 2. Thus, the outer filling 40B can be suppressed from entering the inside of the wrapping tube 2 from the overlapping area 2*a*.

Further, according to one or more embodiments, the outer filling 40B is disposed so as not to be adjacent to the overlapping area 2*a* of the wrapping tube 2, and is disposed so as to be closer to the outside edge of the press winding 2 which is the outside of the overlapping area 2*a*. For example, in the cross section shown in FIG. 9, the outer filling 40B is disposed closer to the left side (the support wire 50 side) of FIG. 9 viewed from the overlapping area 2*a* so as to be closer to the edge of the wrapping tube 2 which is the outside (lower side in FIG. 9) of the overlapping area 2*a*. Thus, the outer filling 40B can be further suppressed from entering the inside of the wrapping tube 2 from the overlapping area 2*a*.

<Method of Manufacturing Optical Fiber Cable 100>

Figure 10:
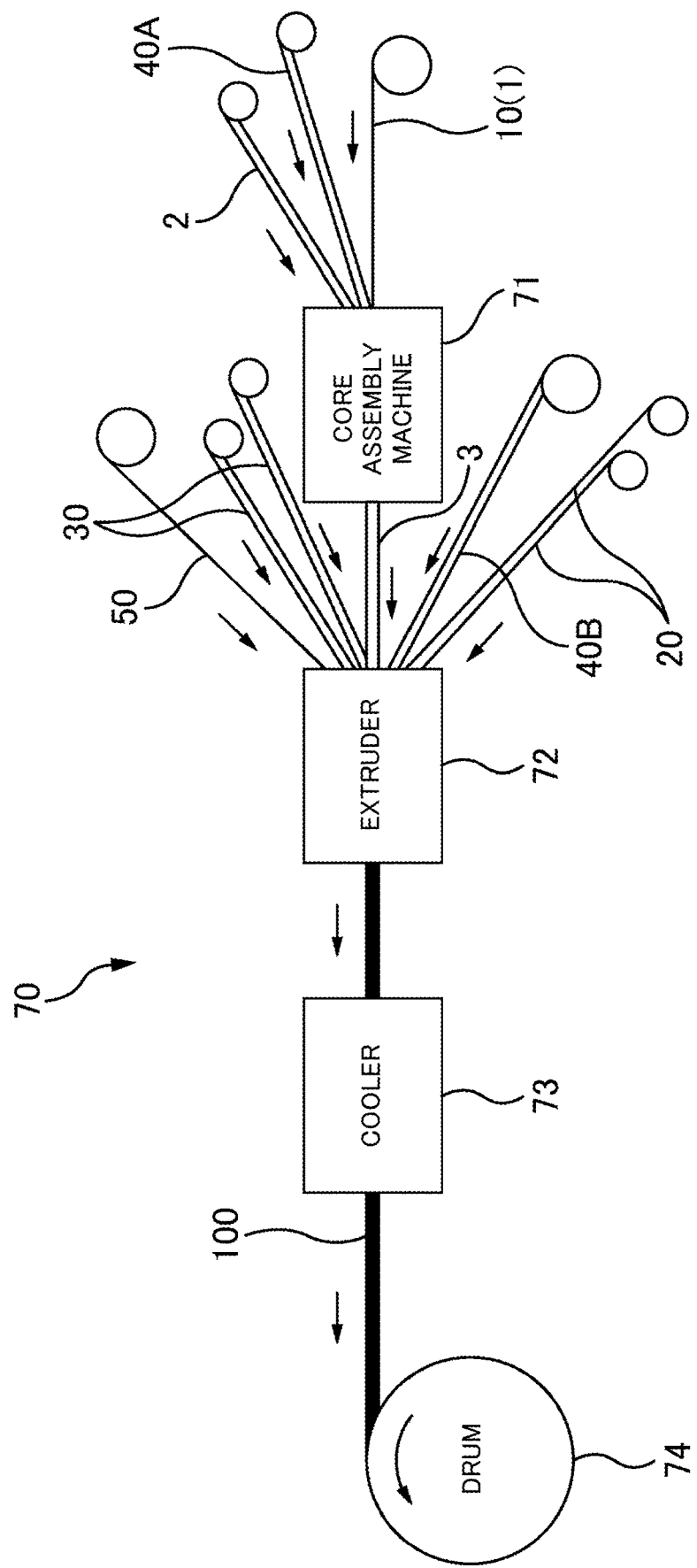
FIG. 10 is an explanatory view of an apparatus for manufacturing the optical fiber cable according to one or more embodiments.

FIG. 10 is an explanatory view of a manufacturing apparatus 70 of the optical fiber cable 100 according to one or more embodiments. Similar to the above-described embodiments, the manufacturing apparatus 70 includes a supply source of each member, a core assembly machine 71, an extruder 72, a cooler 73, and a drum 74. The core assembly machine 71 twists and arranges the inner filling 40A in the SZ manner inside the core 3. The method of the core assembly machine 71 twisting the inner filling 40A in the SZ manner may be any of the first to fourth twisting methods described above or any other method. Similar to the above-described embodiments, the core 3, the pair of tension members 20, the outer filling 40B, and the support wire 50 are supplied to the extruder 72. The pair of separators 30 is also supplied. By extruding the molten resin out of the die hole while inserting each member into the die hole (not shown) of the extruder 72, as shown in FIG. 9, the optical fiber cable 100 in which the members are collectively covered with the sheath 60 is manufactured.

The configuration of an optical fiber cable according to one or more embodiments will be described below with reference to FIG. 11 to FIG. 13.

Figure 11:
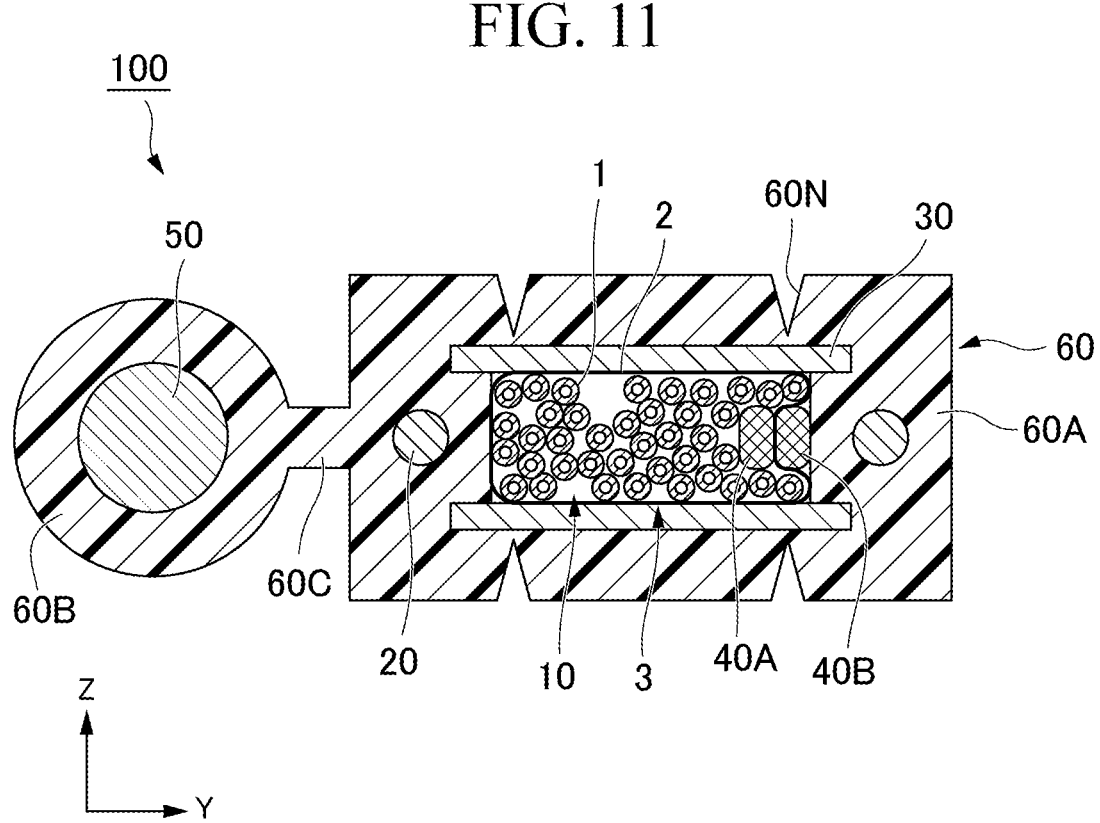
FIG. 11 is a transverse cross-sectional view of an optical fiber cable according to one or more embodiments.

As shown in FIG. 11, the optical fiber cable 100 includes the core 3 having the optical fiber unit 10, the outer filling 40B, the pair of tension members 20, the pair of separators 30, the support wire 50, and the sheath 60.

Here, according to one or more embodiments, an XYZ orthogonal coordinate system will be defined in order to describe the positional relationships within the configuration. The X direction is the direction in which the optical fiber cable 100 extends. The Y direction is a direction in which the pair of tension members 20 face each other. The Z direction is a direction orthogonal to both the X direction and the Y direction. Hereinafter, the X direction is referred to as the longitudinal direction, the Y direction is referred to as the width direction, and the Z direction is referred to as the thickness direction. The cross-section perpendicular to the longitudinal direction is referred to as a transverse cross-section.

Figure 12:
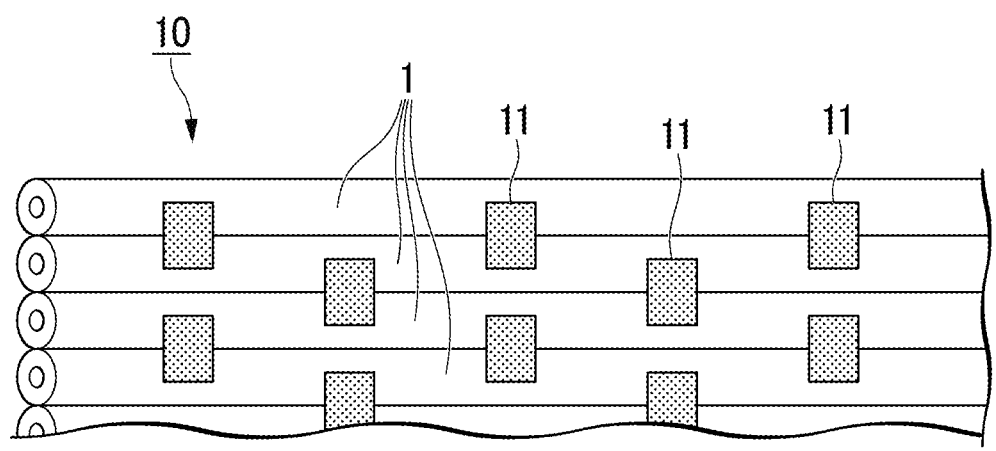
FIG. 12 is an explanatory view of an optical fiber unit of FIG. 11.

As shown in FIG. 12, the optical fiber unit 10 according to one or more embodiments is a so-called intermittently-fixed optical fiber ribbon, and is formed by intermittently connecting a plurality of optical fibers 1 by the connecting portions 11. More specifically, the plurality of optical fibers 1 are arranged in parallel, and adjacent optical fibers 1 are connected by the connecting portions 11. The connecting portions 11 are disposed at regular intervals in the longitudinal direction. The connecting portions 11 connecting the adjacent optical fibers 1 which are adjacent to each other 1 in the vicinity of the adjacent optical fibers 1 are disposed at positions shifted in the longitudinal direction, with respect to the positions of the connecting portions 11 connecting the adjacent optical fibers 1. In this manner, the connecting portions 11 are disposed in a staggered manner with respect to both directions of the longitudinal direction and the width direction orthogonal to the longitudinal direction.

The connecting portions 11 are formed of, for example, a UV curable resin or the like, and are bonded to the optical fibers 1 adjacent to each other to connect the optical fibers 1 with each other. By pulling the optical fibers 1 connected to each other by the connecting portions 11 away from each other in the width direction of the optical fiber unit 10 with fingers, for example, the connection state can be released by separating the connecting portions 11 from the optical fibers 1 by the force of the fingers.

The configuration of the optical fiber unit 10 is not limited to the intermittently-fixed optical fiber ribbon, but may be, for example, a configuration in which a plurality of optical fibers 1 are bundled with a binding material or the like.

As the optical fibers 1, an optical fiber strand or an optical fiber core wire can be used. The primary layer or secondary layer covering the bare fiber of the optical fibers 1 may be formed of a UV curable resin. In addition, for identification of the optical fibers 1, the secondary layer itself may be colored, or a colored layer may be further provided on the outer periphery of the secondary layer. Alternatively, an identification marking may be provided on the outer periphery of the optical fibers 1.

As shown in FIG. 11, the core 3 is formed by wrapping the optical fiber unit 10 and the inner filling 40A by the wrapping tube 2. The inner filling 40A is disposed inside the wrapping tube 2.

A plastic tape member or the like can be used as the wrapping tube 2. For example, polyethylene terephthalate (PET) can be used as a material of the wrapping tube 2.

As the inner filling 40A, it is desirable to use a yarn whose fineness can be freely selected or changed. As a material for forming the inner filling 40A, for example, polypropylene (PP), polyester (PEs) or the like can be used. According to one or more embodiments, a yarn made of PP is used as the inner filling 40A. The material of the inner filling 40A is not limited to PP yarns, and some or all of the inner filling 40A may be replaced with water absorbing yarns and the like.

According to one or more embodiments, the optical fiber unit 10 and the inner filling 40A are wrapped by the wrapping tube 2 while twisted together in the SZ manner. Thus, the tension and the side pressure applied to the optical fiber 1 can be suppressed, and the intermediate post-branching operation or the like can be easily performed.

Further, the optical fiber unit 10 and the inner filling 40A may be twisted in a spiral.

The outer filling 40B is disposed in the gap between the wrapping tube 2 and the sheath 60, that is, on the outside of the core 3. The outer filling 40B can be formed using a PP yarn or the like, similar to the inner filling 40A. Thus, by disposing the inner filling 40A and the outer filling 40B on the inside and the outside of the core 3, it is possible to prevent running of water on both the inside and the outside of the core 3. In a case where the number of fibers of the optical fiber 1 included in the core 3 is small, the inner filling 40A secures the volume of an accommodation space that will be described later. That is, when the sheath 60 is extruded, the inner filling 40A resists the pressure of the resin that forms the sheath 60, thereby making it possible to prevent the accommodation space from being narrowed excessively. In addition, in order to form the accommodation space appropriately, the upper limit and lower limit of the cross-sectional area of the accommodation space are set, and the amount of the inner filling 40A may be adjusted such that the cross-sectional area of the accommodation space is in the range of the upper limit and the lower limit.

The pair of tension members 20 are disposed so as to sandwich the core 3 and the outer filling 40B in the width direction. As the tension members 20, steel wire, metal fiber, aramid fiber, glass fiber, carbon fiber, fiber reinforced plastic (FRP), or the like can be used. The tension members 20 function to resist the tension applied to the optical fibers 1 in the longitudinal direction, and suppress the application of the tension to the optical fibers 1.

The pair of separators 30 are disposed so as to sandwich the core 3 and the outer filling 40B in the thickness direction. The separators 30 are each formed in a plate shape extending in the width direction in a transverse cross-sectional view, and are disposed substantially in parallel with each other. The sheath 60 partially enters between the pair of separators 30 from both sides in the width direction. The pair of separators 30 and the sheath 60 between the pair of separators form a substantially rectangular accommodation space in a transverse cross-sectional view. The core 3 and the outer filling 40B are disposed in the substantially rectangular accommodation space.

As a material of the separators 30, a sheet material such as polypropylene, polyamide, or polyimide can be used. The separators 30 may be formed of a material having a melting point higher than the melting point of the sheath 60 in order to prevent fusion with the sheath 60 at the time of extrusion molding of the sheath 60.

The support wire 50 is formed of a steel wire or the like. The outer diameter of the support wire 50 is larger than the outer diameter of the tension members 20. The support wire 50 and the pair of tension members 20 are disposed side by side in the width direction. The support wire 50 is used as a suspension line for the overhead installation of the optical fiber cable 100. The optical fiber cable 100 may not have the support wire 50.

The sheath 60 has a first covering portion 60A, a second covering portion 60B, and a connecting portion 60C connecting the first covering portion 60A and the second covering portion 60B to each other.

The first covering portion 60A integrally covers the core 3, the outer filling 40B, the pair of separators 30, and the pair of tension members 20. The second covering portion 60B covers the support wire 50.

The first covering portion 60A is formed in a substantially rectangular shape in a transverse cross-sectional view. A notch 60N is formed in a portion covering the separator 30 in the first covering portion 60A. The notch 60N is formed in a V-shape in a transverse cross-sectional view, and the width gradually decreases toward the separator 30. A pair of notches 60N are formed in each of the upper end surface and the lower end surface of the first covering portion 60A.

In a case where the core 3 is taken out of the optical fiber cable 100, a cutting blade or the like is brought into contact with each notch 60N, and cuts the first covering portion 60A covering the separator 30. Thereby, the first covering portion 60A can be divided and the core 3 can be easily taken out.

As the material of the sheath 60, polyolefin (PO) resin such as polyethylene (PE), polypropylene (PP), ethylene ethyl acrylate copolymer (EEA), ethylene vinyl acetate copolymer (EVA), and ethylene propylene copolymer (EP), polyvinyl chloride (PVC), or the like can be used. The sheath 60 can be formed by extrusion molding or the like. Even in this case, since the optical fiber unit 10 is wrapped by the wrapping tube 2, the sheath 60 flowing at high temperature can be suppressed from entering the gap between the optical fibers 1. It is desirable for the set temperature at the time of extrusion molding of the sheath 60 to be lower than the melting point of the separator 30 or the wrapping tube 2 such that the separator 30 and the wrapping tube 2 are not fused with the sheath 60.

EXAMPLES

Hereinafter, the above embodiments will be described using specific examples. The following examples do not limit the present invention.

Example 1

The optical fiber cable 100 of the present example has a configuration in which four-fiber intermittently-fixed optical fiber ribbons are used as the optical fiber unit 10, and six intermittently-fixed optical fiber ribbon s are wrapped by the wrapping tube 2. As the inner filling 40A, one 1670 dtex PEs water absorbing yarn is used. As the outer filling 40B, one 1670 dtex PEs water absorbing yarn is used. A tape made of PET with a thickness of 0.25 mm is used as the wrapping tube 2. The thickness in the thickness direction of the first covering portion 60A is about 3.5 mm, and the width in the width direction is about 5.5 mm. The installation density of the optical fiber 1 in the accommodation space formed by the pair of separators 30 and the sheath 60 between the separators 30 is in the range of 8.5 to 10.9 fibers/mm². The installation density of the optical fiber is a numerical value defined by the following Expression (1). In Expression (1), d is the installation density of the optical fiber, N is the number of fibers of the optical fiber, S is the sectional area of the accommodation space, and P is the sum of the cross-sectional areas of each member accommodated in the accommodation space (inner filling 40A, outer filling 40B, and wrapping tube 2).

$$d = N \div (S - P) \quad (1)$$

Here, by setting the installation density d of the optical fiber 1 in a predetermined range, the following advantages can be obtained. That is, when the installation density d of the optical fiber 1 is significantly small, the possibility of the optical fiber 1 moving in the accommodation space increases. Further, the running water length at the time of the waterproof test becomes long, and the possibility of failing the waterproof test increases. On the other hand, if the installation density d of the optical fiber 1 is significantly large, transmission loss may increase.

The above-described numerical range of the installation density d may be used as an index for making the optical fiber cable 100 have desired performance in a case where, for example, the amount of the inner filling 40A and the outer filling 40B are fixed. However, the installation density d described above does not limit the present invention, and the optical fiber cable 100 may be defined by an index other than the installation density d according to the type, shape, application, or the like of the optical fiber cable 100.

Under the above conditions, the core 3 is formed by SZ twisting the optical fiber unit 10 and the inner filling 40A and wrapping them with the wrapping tube 2. Further, while the core 3 is formed, the outer filling 40B and the like are longitudinally attached to the core 3, and the first covering portion 60A is extruded around the respective members. Here, in a case where a plurality of optical fiber cables 100 are prepared by changing the tension of the outer filling 40B when covering the outer filling 40B with the first covering portion 60A, the excess length ratio is in the range of 99.85% to 100.2%. The excess length ratio refers to the ratio of the length of the non-tensioned outer filling 40B to the length of the sheath 60 in the longitudinal direction. The length of the non-tensioned outer filling 40B is measured by taking the outer filling 40B out of the sheath 60.

Table 1 below shows the results of checking the transmission loss and the waterproof performance of the plurality of optical fiber cables 100 having different excess length ratios as described above. In this example, the transmission loss at a wavelength of 1550 nm is measured by an OTDR (optical time domain reflectometer). In Table 1 below, the maximum value of the transmission loss of the 24 optical fibers 1 included in each optical fiber cable 100 is described.

In addition, the waterproof test is performed under the conditions of a hydraulic head of 1 meter and 24 hours, using tap water, according to IEC 60794-1-22 F5B. As a result, in the case where running water length is 3 meters or less, the test is passed, and in the case where running water length exceeds 3 meters, the test is failed.

TABLE 1

|  | Example 1 | | | | Comparative Example 1 | Comparative Example 2 |
|---|---|---|---|---|---|---|
| Excess length ratio | 99.95% | 100% | 100.1% | 100.2% | 99.85% | — |
| Transmission loss | 0.23 dB/km | 0.21 dB/km | 0.20 dB/km | 0.21 dB/km | 0.28 dB/km | 0.20 dB/km |
| Running water length | ≤3 m | ≤3 m | ≤3 m | ≤3 m | ≤3 m | fail |

As shown in Table 1, within the range where the excess length ratio is 99.95% or more (Example 1), the transmission loss is 0.25 dB/km or less and the running water length is 3 meters or less, and good results are obtained.

On the other hand, in the case where the excess length ratio is 99.85% (comparative example 1), the transmission loss is 0.28 dB/km, the transmission loss is larger compared to Example 1, and the test is failed. This is considered to be attributable to the fact that in Comparative example 1, tension applied to the outer filling 40B is larger than that of Example 1.

That is, when the tension of the outer filling 40B is large, the outer filling 40B is strongly pressed against the core 3 to cause the side pressure to act on the optical fiber 1, which increases the transmission loss. In addition, it is also conceivable that in a case where the tension of the outer filling 40B is large, the flow of the resin material of the first covering portion 60A changes when the first covering portion 60A is extruded, and the accommodation space of the core 3 in the first covering portion 60A is reduced. As described above, when the accommodation space of the core 3 is reduced, it is considered that the side pressure acts on the optical fiber 1 to increase the transmission loss.

From the above, in order to suppress the increase in transmission loss by setting the tension of the outer filling 40B within an appropriate range, the excess length ratio of the outer filling 40B may be set to 99.95% or more.

In a case where the excess length ratio is 100.3% or more, the tension applied to the outer filling 40B is significantly low when the outer filling 40B is covered with the first covering portion 60A, so it is difficult to stably manufacture the optical fiber cable 100.

Therefore, from the viewpoint of stably manufacturing the optical fiber cable 100, the extra length ratio may be 100.2% or less.

Comparative Example 2

Figure 13:
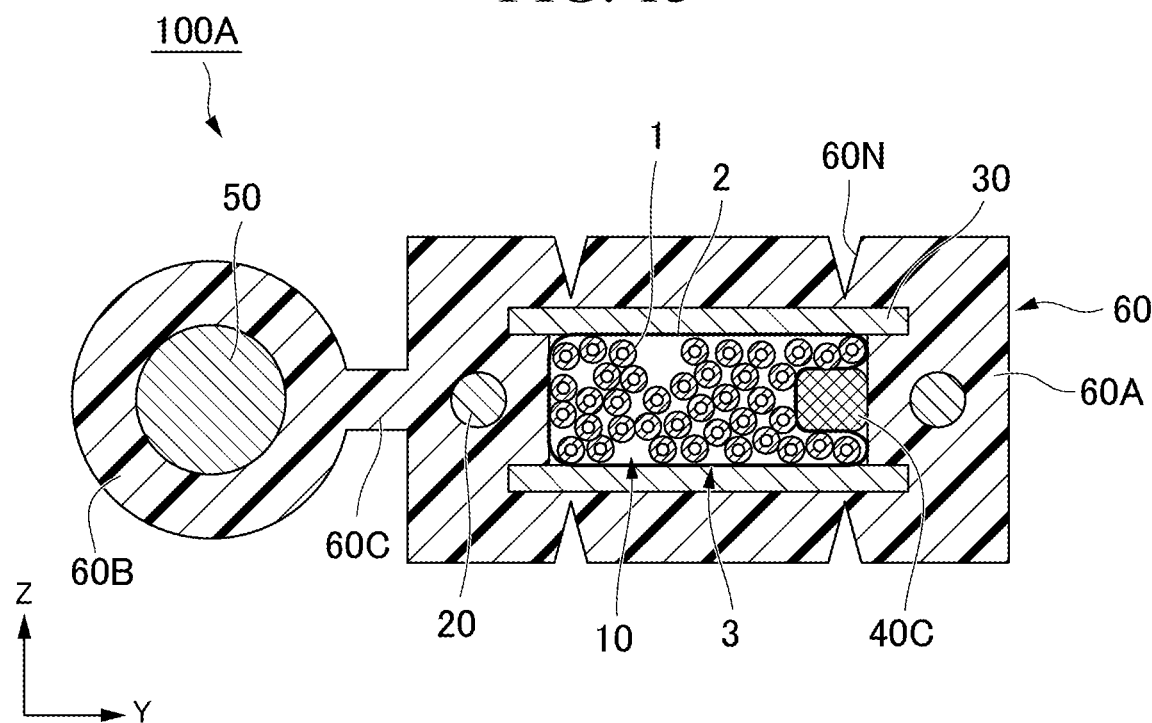
FIG. 13 is a transverse cross-sectional view of an optical fiber cable of a comparative example.

Next, the optical fiber cable 100A of Comparative Example 2 as shown in FIG. 13 is manufactured and its performance is checked. The optical fiber cable 100A of Comparative Example 2 does not have the inner filling 40A, and the fillings of the combined amount of the inner filling 40A and the outer filling 40B in Example 1 are disposed as the outer filling 40C. That is, the optical fiber cable 100A of Comparative Example 2 has the same configuration as the optical fiber cable 100 of Example 1 except that the inner filling 40A of Example 1 is disposed outside the core 3.

As shown in Table 1, in the optical fiber cable 100A of Comparative Example 2, the running water length exceeds 3 meters, and the waterproofing test is failed. This is because the running water in the core 3 cannot be suppressed because there is no filling inside the wrapping tube 2. From this, it can be seen that the inner filling 40A in Example 1 improves the waterproof performance of the optical fiber cable 100.

Further, as shown in FIG. 13, in the optical fiber cable 100A of Comparative Example 2, the outer filling 40C causes the wrapping tube 2 to be largely recessed toward the inside of the core 3. In a case where the core 3 is greatly deformed in this manner, when the optical fiber unit 10 is twisted together inside the core 3, the optical fiber unit 10 may be caught on the depressed portion of the wrapping tube 2 and may not be properly twisted. In particular, in the case where the optical fiber unit 10 and the inner filling 40A are twisted in an SZ manner, the twisting is easily inhibited by deformation of the core 3.

On the other hand, in the optical fiber cable 100 according to Example 1 shown in FIG. 11, the fillings 40A and 40B are separately disposed on both the inside and the outside of the core 3, thereby reducing the deformation of the core 3. Therefore, the occurrence of inconveniences such as the optical fiber unit 10 not being properly twisted can be suppressed.

As described above, according to the optical fiber cable 100 according to one or more embodiments, the fillings 40A and 40B are disposed on both the inside and the outside of the core 3, so that running of water in both the inside and the outside of the core 3 is prevented, and waterproof performance can be secured.

Further, for example, by separately disposing the fillings on both the inside and the outside of the core 3 as compared with the case where the fillings are disposed only on the outside of the core 3, the deformation of the core 3 caused by the outer filling pressing the core 3 can be reduced.

Further, the transmission loss of the optical fiber 1 can be suppressed to a small amount by making the excess length ratio of the outer filling 40B into 99.95% or more.

Further, by setting the extra length ratio of the outer filling 40B to 100.2% or less, the optical fiber cable 100 can be manufactured more stably.

It should be noted that the technical scope of the present invention is not limited to the above-described embodiments, and various modifications can be made without departing from the spirit of the present invention.

For example, in Example 1, 4-fiber intermittently-fixed optical fiber ribbons are used as the optical fiber unit 10 and the total number of fibers included in the core 3 is 24 fibers, but the number of fibers of the optical fiber unit 10 and the total number of fibers included in the core 3 can be changed as appropriate. For example, under the conditions of Example 1, when the total number of fibers in the core 3 is changed, the installation density is 6.5 to 13.5 fibers/mm$^2$ in the case of 8 fibers, and 6.8 to 10.6 fibers/mm$^2$ in the case of 12 fibers. Further, when the size of the first covering portion 60A is made larger than that of Example 1 and a 48-fiber core 3 is used, the installation density is 7.5 to 9.0 fibers/mm$^2$.

In addition, without departing from the spirit of the present invention, it is possible to appropriately replace the constituent elements in the above-described embodiments with well-known constituent elements, and the above-described embodiments and modification examples may be appropriately combined.

REFERENCE SIGNS LIST 1 optical fiber
2 wrapping tube
2a overlapping area
3 core
10 optical fiber unit (intermittently-fixed optical fiber ribbon)
20 tension member
30 separator
40A inner filling
40B outer filling
50 support wire
60 sheath
100 optical fiber cable Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical fiber cable comprising:
   a core comprising:
     optical fibers;
     an inner filling; and
     a wrapping tube that wraps the optical fibers and the inner filling;
   an outer filling disposed outside the core; and
   a sheath that covers the core and the outer filling, wherein a position of the inner filling in the core changes along a longitudinal direction of the optical fiber cable.

2. The optical fiber cable according to claim 1, wherein the outer filling and the inner filling absorb water.

3. The optical fiber cable according to claim 1, wherein the outer filling is longitudinally attached to the core.

4. The optical fiber cable according to claim 1, wherein the optical fibers are twisted together,
   grooves between adjacent ones of the optical fibers are disposed on an outer periphery of a bundle of the optical fibers, and
   the inner filling crosses the grooves.

5. The optical fiber cable according to claim 1, wherein the wrapping tube is wound to have an overlapping area where both edges of the wrapping tube overlap, and
   the outer filling is disposed at a position not adjacent to the overlapping area.

6. The optical fiber cable according to claim 1, wherein the sheath has a rectangular shape in a transverse cross-sectional view.

7. The optical fiber cable according to claim 6, further comprising:
   a pair of separators that sandwich the core, wherein
   each of the separators is disposed between the core and the sheath.

8. An optical fiber cable comprising:
   a core comprising:
     optical fibers;
     an inner filling; and
     a wrapping tube that wraps the optical fibers and the inner filling;
   an outer filling disposed outside the core; and
   a sheath that covers the core and the outer filling, wherein the optical fibers are twisted together,
   grooves between adjacent ones of the optical fibers are disposed on an outer periphery of a bundle of the optical fibers, and
   the inner filling crosses the grooves.

9. The optical fiber cable according to claim 8, wherein the outer filling and the inner filling absorb water.

10. The optical fiber cable according to claim 8, wherein the outer filling is longitudinally attached to the core.

11. The optical fiber cable according to claim 8, wherein the wrapping tube is wound to have an overlapping area where both edges of the wrapping tube overlap, and
    the outer filling is disposed at a position not adjacent to the overlapping area.

12. The optical fiber cable according to claim 8, wherein the sheath has a rectangular shape in a transverse cross-sectional view.

13. The optical fiber cable according to claim 12, further comprising:
    a pair of separators that sandwich the core, wherein
    each of the separators is disposed between the core and the sheath.

14. An optical fiber cable comprising:
    a core comprising:
      optical fibers;
      an inner filling; and
      a wrapping tube that wraps the optical fibers and the inner filling;
    an outer filling disposed outside the core; and
    a sheath that covers the core and the outer filling, wherein the wrapping tube is wound to have an overlapping area where both edges of the wrapping tube overlap, and
    the outer filling is disposed at a position not adjacent to the overlapping area.

15. The optical fiber cable according to claim 14, wherein the outer filling and the inner filling absorb water.

16. The optical fiber cable according to claim 14, wherein the outer filling is longitudinally attached to the core.

17. The optical fiber cable according to claim 14, wherein the sheath has a rectangular shape in a transverse cross-sectional view.

18. The optical fiber cable according to claim 17, further comprising:
    a pair of separators that sandwich the core, wherein each of the separators is disposed between the core and the sheath.

* * * * *